United States Patent [19]

Omura et al.

[11] Patent Number: 5,053,494
[45] Date of Patent: Oct. 1, 1991

[54] FIBER REACTIVE POLYAZO DYE HAVING TWO VINYLSULFONE TYPE REACTIVE GROUPS THROUGH TRIAZINYL BRIDGING GROUP

[75] Inventors: Takashi Omura, Ashiya; Naoki Harada, Suita; Hirokazu Sawamoto, Minoo, all of Japan

[73] Assignee: Sumitomo Chemical Company, Limited, Osaka, Japan

[21] Appl. No.: 425,351

[22] Filed: Oct. 20, 1989

Related U.S. Application Data

[63] Continuation of Ser. No. 110,874, Oct. 21, 1987, abandoned.

[30] Foreign Application Priority Data

Nov. 6, 1986 [JP] Japan .................. 61-264683
Feb. 24, 1987 [JP] Japan .................. 62-42222
Feb. 26, 1987 [JP] Japan .................. 62-44615

[51] Int. Cl.$^5$ .................. C09B 62/513; D06P 1/384
[52] U.S. Cl. .................. 534/642; 534/582; 534/598; 534/887
[58] Field of Search .................. 534/617, 637, 642

[56] References Cited

U.S. PATENT DOCUMENTS

| | | | |
|---|---|---|---|
| 4,412,948 | 11/1983 | Omura et al. | 534/637 |
| 4,551,150 | 11/1985 | Otake et al. | 534/637 X |
| 4,663,440 | 5/1987 | Omura et al. | 534/637 |
| 4,698,421 | 10/1987 | Kayane et al. | 534/637 X |

FOREIGN PATENT DOCUMENTS

| | | | |
|---|---|---|---|
| 0076782 | 4/1983 | European Pat. Off. | 534/642 |
| 1350612 | 12/1963 | France | 534/642 |
| 61-247759 | 11/1986 | Japan | 534/637 |

OTHER PUBLICATIONS

Kagaku to Kougyou (Science and Industry), vol. 42, No. 11, pp. 583–594 (1968).

Primary Examiner—Mary C. Lee
Assistant Examiner—Fiona T. Powers
Attorney, Agent, or Firm—Stevens, Davis, Miller & Mosher

[57] ABSTRACT

A polyazo compound of the following formula,

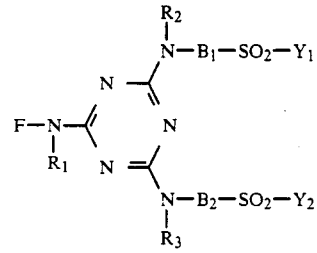

wherein F is a bisazo or trisazo dye moiety, $R_1$, $R_2$ and $R_3$ are independently of one another are each hydrogen or alkyl, $B_1$ and $B_2$ independently of one another are each phenylene or naphthylene, $Y_1$ and $Y_2$ independently of one another are each —CH=CH$_2$ or —CH$_2$CH$_2$L in which L is group capable of being split by the action of an alkali. The compound is useful for dyeing or printing fiber materials to give dyed or printed products with superior dye performance such as build-up property.

11 Claims, No Drawings

FIBER REACTIVE POLYAZO DYE HAVING TWO VINYLSULFONE TYPE REACTIVE GROUPS THROUGH TRIAZINYL BRIDGING GROUP

This application is a continuation of application Ser. No. 110,874, filed Oct. 21, 1987 now abandoned.

The present invention relates to a polyazo compound, a process for producing the same and a process for dyeing or printing fiber materials. More specifically, the present invention relates to a polyazo compound having two vinylsulfone type fiber reactive groups per molecule, which is particularly useful for dyeing or printing fiber materials.

Polyazo fiber reactive dyes have teen extensively used for dyeing or printing fiber materials such as cellulose fibers and polyamide fibers. Of these, so-called vinylsulfone type fiber reactive dye: are prominent because of their superior dye performance. For example, bisazo reactive dyes of this kind are known from U.S. Pat. Nos. 4,412,94, 4,663,440, 4,551,150 and 4,698,421. Moreover, reactive dyes having two vinylsulfone fiber reactive groups per molecule are disclosed in the article, "Kagaku to Kougy (Science and Industry), Vol. 42, No. 11, page 583(1968)

In recent years, however, need for the better dye performance has become severe from technical and economical points of view in the industry of demands, and there are many problems to be solved, for example, with respect to dyeing performance such as build-up property which is one of fundamental properties required for the reactive dyes.

In order to find a polyazo compound meeting the requirement for the dye performance, the present inventors have undertaken extensive studies on chromophores, a kind and number of fiber reactive groups, and a manner of linking the chromophores and the fiber reactive groups, and have found a specific compound meeting the needs described above.

The present invention provides a polyazo compound of the following formula (I),

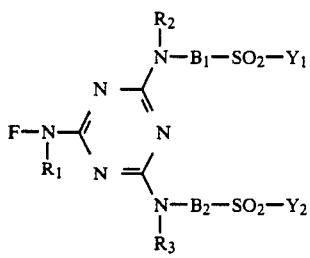
(I)

wherein $R_1$, $R_2$ and $R_3$ independently of one another are each hydrogen or unsubstituted or substituted alkyl, $B_1$ and $B_2$ independently of one another are each unsubstituted or substituted phenylene or naphthylene, and $Y_1$ and $Y_2$ independently of one another are each —CH=CH$_2$ or —CH$_2$CH$_2$L in which L is a group splittable by the action of an alkali, and F is a polyazo dye moiety selected from the group consisting of those represented by the following formulas (1), (2), (3) and (4) in each free acid form, the formula (1) being

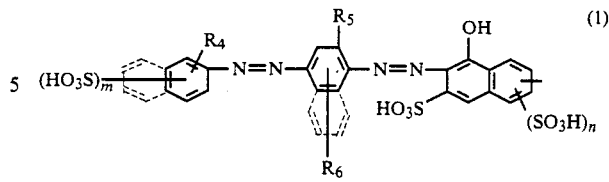
(1)

wherein $R_4$ is hydrogen, chloro, methyl, methoxy, ethyl, ethoxy, nitro or carboxy, $R_5$ is hydrogen, methyl, methoxy, ethyl, ethoxy or sulfo, $R_6$ is hydrogen, methyl, methoxy, ethyl, ethoxy, acetylamino, ureido or sulfo, m is 1, 2 or 3 and n is 0 or 1, the formula (2) being

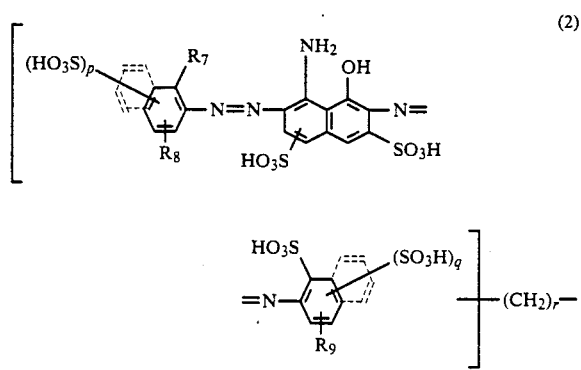
(2)

wherein $R_7$ is hydrogen, methyl, methoxy, ethyl, ethoxy, chloro, carboxy or sulfo, $R_8$ and $R_9$ independently of one another are each hydrogen, methyl, methoxy, ethyl, ethoxy, chloro, bromo, acetylamino, sulfamoyl or carbamoyl and p and q independently of one another are each 0, 1 or 2, r is 0 or 1, the formula (3) being

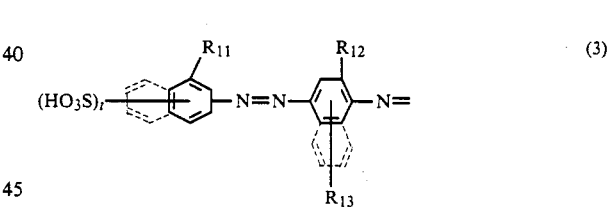
(3)

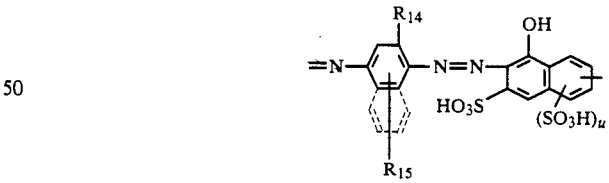

wherein $R_{11}$ is hydrogen, chloro, $C_{1-4}$ alkyl, $C_{1-4}$ alkoxy, nitro or carboxy, $R_{12}$ and $R_{14}$ independently of one another are each hydrogen, $C_{1-4}$ alkyl, $C_{1-4}$ alkoxy or sulfo, $R_{13}$ and $R_{15}$ independently of one another are each hydrogen, $C_{1-4}$ alkyl, C-hd 1-4 alkoxy, $C_{2-5}$ alkanoylamino, benzoylamino, ureido or sulfo, t is 1,2 or 3 and u is 0 or 1, and the formula (4) being $$A-N=N-D-N=N-E- \quad (4)$$

wherein A is sulfonaphthyl or sulfophenyl represented by the following formulas (a) and (b) in each free acid form, respectively,

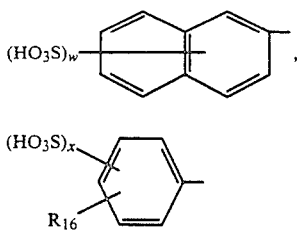 (a)

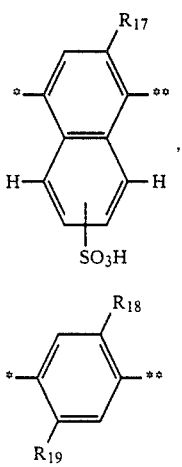

wherein $R_{16}$ is hydrogen, $C_{1-4}$ alkyl or $C_{1-4}$ alkoxy, w is or 3 and x is 1 or 2, D is sulfonaphthylene or phenylene represented by the following formulas (c) and (d) in each free acid form, respectively,

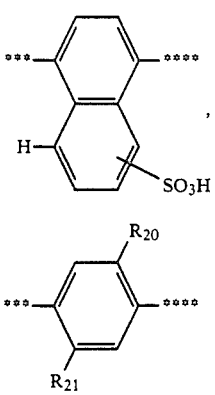

wherein the linkages marked by * and ** bond to A—N=N— and —N=N—E, respectively, $R_{17}$ is hydrogen, methoxy or sulfo, $R_{18}$ is hydrogen, $C_{1-4}$ alkyl, $C_{1-4}$ alkoxy or sulfo, and $R_{19}$ is hydrogen, $C_{1-4}$ alkyl, $C_{1-4}$ alkoxy, $C_{2-5}$ alkanoylamino, benzoylamino, ureido or $C_{1-4}$ alkylsulfonylamino, and E is sulfonaphthylene or phenylene represented by the following formulas (e) and (f) in each free acid form, respectively,

wherein the linkages marked by * and ** bond to the azo and $$-\underset{R_1}{\overset{}{N}}-,$$

respectively, $R_{20}$ is hydrogen, $C_{1-4}$ alkyl, $C_{1-4}$ alkoxy or sulfo, and $R_{21}$ is hydrogen, $C_{1-4}$ alkyl, $C_{1-4}$ alkoxy, $C_{2-5}$ alkanoylamino, benzoylamino, ureido or $C_{1-4}$ alkylsulfonylamino, provided that at least two of A, D and E are the sulfonaphthyl or sulfonalhthylene represented by the formulas (a), (c) and (e). The present invention further provides a process for producing the polyazo compound of the formula (I), which comprises reacting a cyanuric halide, an amine compound of the following formula II),

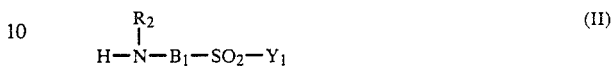 (II)

wherein $R_2$, $B_1$ and $Y_1$ are as defined above, another amine compound of the following formula (III),

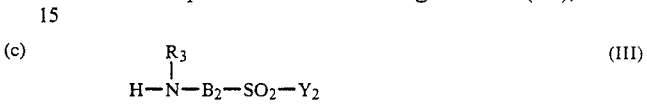 (III)

wherein $R_3$, $B_2$ and $Y_2$ are as defined above, and three or four compounds capable of being diazotized and/or coupled to form the desired polyazo compound.

The present invention also provides a process for dyeing or printing fiber materials, which comprises using the polyazo compound of the formula (I).

In the above bisazo dye moiety of the formula (4), particularly preferred is the case where $R_{16}$ is hydrogen, methyl, ethyl, methoxy or ethoxy, $R_{17}$ is hydrogen, $R_{18}$ is hydrogen, methyl, methoxy or sulfo, $R_{19}$ is methyl, methoxy, acetylamino or ureido, $R_{20}$ is hydrogen, methyl, methoxy or sulfo, and $R_{21}$ is methyl, methoxy, acetylamino or ureido. When $R_1$ is hydrogen, E is preferably 8-sulfonaphthylene.

In the above trisazo dye moiety of the formula (3), particularly preferred is a case where $R_{11}$ is hydrogen, $R_{12}$ and $R_{14}$ independently of one another are each hydrogen, methyl, ethyl, methoxy, ethoxy or sulfo, and $R_{13}$ and $R_{15}$ independently of one another are each hydrogen, methyl ethyl, methoxy, ethoxy, acetylamino, ureido or sulfo.

The alkyl represented by $R_1$, $R_2$ and $R_3$ may be unsubstituted or substituted with hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo or sulfamoyl groups. Examples of the alkyl are as those described in, for example, Published Unexamined Japanese Pat. Application No. 122549/1984. Of these, preferred are methyl or ethyl. In the present invention, preferably $R_1$ is hydrogen or methyl, and $R_2$ and $R_3$ independently of one another are each preferably hydrogen, methyl or ethyl. More preferable is a case where $R_1$ is hydrogen, and any one of $R_2$ and $R_3$ is hydrogen.

The phenylene represented by $B_1$ and $B_2$ may be unsubstituted or substituted with one or two substituents. Examples of the substituents are methyl, ethyl, methoxy, ethoxy, chloro, bromo, nitro, sulfo and carboxy. The naphthylene represented by $B_1$ and $B_2$ may be unsubstituted or substituted by one sulfo. Preferred examples of these phenylene and naphthylene are as those described in Published Unexamined Japanese Pat. Application No. 22549/1984. In the present invention, most preferred are phenylene and naphthylene unsubstituted or substituted by at most one substituent.

The symbol L in —$CH_2CH_2L$ which represents $Y_1$ and $Y_2$ includes those known as capable of being split by the action of an alkali. Examples thereof are sulfato, thiosulfato, acetoxy, phosphato, chloro and the like. In the present invention, preferred is a case where $Y_1$ and $Y_2$ are both β-sulfatoethyl, which is incorporated with vinyl to a small extent.

The polyazo compound (I) can be produced in a manner known per se using a cyanuric halide such as cyanuric chloride, fluoride and the like, an amine compound of the formula (II), another amine compound of the formula (III), and starting compounds capable of forming a polyazo dye.

For the production of the polyazo compound having the respective dye moieties of the formulas (1), (2) and (4), the starting compounds include those represented by the following formulas (IV), (V) and (VI) in each free acid form, respectively,

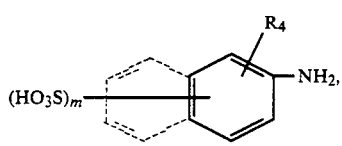
(IV-1)

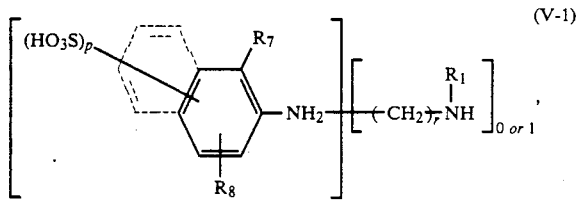
(V-1)

A—NH$_2$ (VI-1)

wherein $R_1$, $R_4$, $R_7$, $R_8$, A, m, p and r are as defined above,

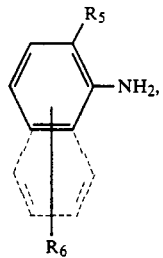
(IV-2)

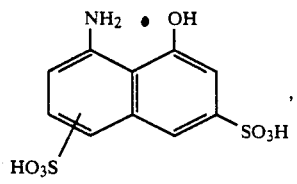
(V-2)

H—D—NH$_2$ (VI-2)

wherein $R_5$, $R_6$ and D are as defined above, and

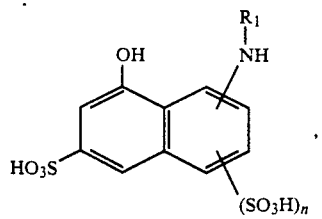
(IV-3)

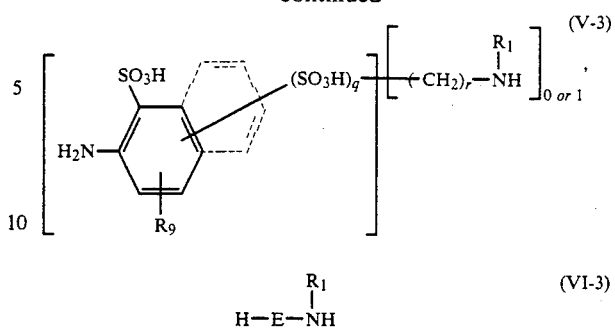
(V-3)

(VI-3)

wherein $R_1$, $R_9$, E, n and q are as defined above, provided that the group,

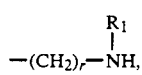

is present in any one of the group represented by the formulas (v-1) and V-3), and for the production of the polyazo compound having the dye moiety of the formula (3), the starting compounds include a compound of the following formula (VII) in a free acid form,

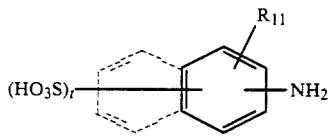
(VII)

wherein $R_{11}$ and t are as defined above, a compound of the following formula (VIII),

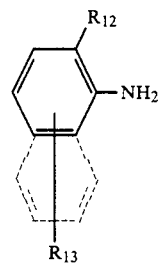
(VIII)

wherein $R_{12}$ and $R_{13}$ are as defined above, a compound of the following formula (IX),

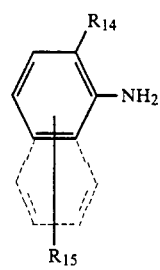
(IX)

wherein $R_{14}$ and $R_{15}$ are as defined above, and a compound of the following formula (X) in a free acid form,

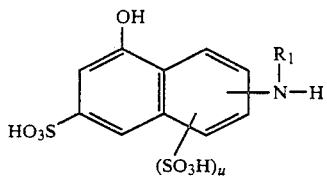

wherein $R_1$ and $u$ are as defined above.

In the production of the desired bisazo compound having the dye moiety of the formulas (1) and (4), the compounds of the formula (IV-1) and VI-1) are first diazotized, then coupled with a compound of the formula (IV-2) or (VI-2), respectively, thereby obtaining the respective monoazo intermediate compounds. The monoazo intermediate compounds are then diazotized, then coupled with a compound of the formula (IV-3) or (VI-3), respectively, thereby obtaining the respective bisazo intermediate compounds.

In the production of the desired bisazo compound having the dye moiety of the formula (2), the compound of the formula (V-1) is first diazotized, then coupled with the compound of the formula (V-2), thereby obtaining the monoazo intermediate compound. Successively, the compound of the formula (V-3) is diazotized, and coupled with the above monoazo intermediate compound, thereby obtaining the bisazo intermediate compound.

The bisazo intermediate compound obtained above can be subjected to a condensation reaction with a cyanuric halide and both amines of the formulas (II) and (III) to obtain the desired bisazo compound.

In the production of the desired trisazo compound, the starting compounds of the formulas (VII), (VIII) and (IX) are subjected to diazotization and coupling reactions to obtain a bisazo intermediate compound. On the other hand, the compound of the formula (X) and both amines of the formulas (II) and (III) are subjected to condensation reactions with a cryanuric chloride in an optional order to obtain a desired condensate. Successively, the bisazo intermediate compound is diazotized, and then coupled with the above condensate, whereby the desired trisazo compound can be obtained.

In the above manners, the diazotization, coupling and condensation can be carried out under reaction conditions well known by persons skilled in this art.

Examples of the compounds (IV-1), (V-1), (V-3) and (VI-1) are 1-aminobenzene-2-, 3- or 4-sulfonic acid, 2-amino-4- or 5-sulfobenzoic acid, 4-amino-2-sulfobenzoic acid, 4-aminotoluene-2- or 3-sulfonic acid, 2-aminotoluene-4- or 5-sulfonic acid, 2-aminoanisole-4- or 5-sulfonic acid, 4-aminoanisole-2- or 3-sulforic acid, 3- or 4-chloro-2-aminotoluene-5-sulfonic acid, 5-chloro-2-aminotoluene-3- or 4-sulfonic acid, 6-chloro-2- or 3-aminotoluene-4-sulfonic acid, 1-aminobenzene-2,5-, 2,4- or 3,5-disulfonic acid, 2-aminotoluene-3,5-, 4,5- or 4,6-disulfonic acid, 4-aminotoluene-2,5-disulfonic acid, 2-aminonaphthalene-5-, 6-, 7- or 8-sulfonic acid, 1-aminonaphthalene-2-, 3-, 4-, 5-, 6-, 7- or 8-sulfonic acid, 2-aminonaphthalene-4,8-, 6,8-, 1,5-, 1,7-, 5,7-, 3,6-, 3,7- or 4,7-disulfonic acid, 1-aminonaphthalene-2,4-, 2,5-, 3,6-, 3,7-, 3,8-, 4,6-, 4,7-, 4,8-, 5,7- or 6,8-disulfonic acid, 2-aminonaphthalene-3,6,8-, 4,6,8- or 1,5,7-trisulfonic acid, 1-aminonaphthalene-2,4,7-, 2,4,8-, 3,5,7-, 3,6,8- or 4,6,8-trisulfonic acid and the like.

Additional examples of the above compounds and their masked compounds are 4-acetylamino-2-aminobenzenesulfonic acid, 2,4-diaminobenzene-1,5-disulfonic acid, 2,4-, or 2,5-diaminobenzenesulfonic acid, 2,5-diaminobenzene-1,4-disulfonic acid, 2,4-diamino-5-methylbenzenesulfonic acid, 2-amino-4-aminomethyl- or N-methylaminomethyl-benzenesulfonic acid, 2-amino-5-aminomethyl-naphthalene-1-sulfonic acid, 2-amino-5-aminomethyl-naphthalene-1,7-disulfonic acid and the like. Of these, preferred are those having a substituent, particularly those having sulfo, at the position next to the amino group, when those compounds are used as a diazo component.

Examples of the compounds (IV-2) and (VI-2) are aniline, 3-methyl-, chloro-, methoxy-, ureido-, acetylamino-, benzoylamino-, carboxyethylcarbonylamino or acryloylamino-aniline, 2,5-dimethyl-, diethyl-, dimethoxy- or diethoxy-aniline, 5-methyl-2-methoxyaniline, 5-acetyl-2-methylaniline, 4-acetylamino-2-aminobenzenesulfonic acid, 1-aminonaphthalene, 1-aminonaphthalene-2-, 6- or 7-sulfonic acid, 1-amino-2-methoxy or ethoxynaphthalene-6- or 7-sulfonic acid, 2-methyl or methoxyaniline, 2,3- or 3,5-dimethylaniline, 2-methoxy-5-acetylaminoaniline and the like.

Examples of the compound (V-2) are 1-amino-8-naphthol-3,6-disulfonic acid and 1-amino-8-naphthol4,6-disulfonic acid.

Examples of the compounds (IV-3) and (VI-3) are aniline, 3-chloro, methyl-, ureido-, acetylamino-, methoxy- or benzoylamino-aniline, 2,5-dimethylaniline, 2,5-dimethoxyaniline, 5-methyl-2-methoxyaniline, 5-acetylamino-2-methylaniline, 4-acetylamino-2-aminobenzenesulfonic acid, 1-aminonaphthalene-6- or 7-sulfonic acid, 2- or 3-amino-5-naphthol-7-sulfonic acid, 2-amino-8-naphthol-4,6-disulfonic acid, 1-amino-5-naphthol-7sulfonic acid, 1-aminonaphthalene-8-sulfonic acid, 2- or 3-methylamino-5-naphthol-7-sulfonic acid, 2-amino-5-naphthol-1,7-disulfonic acid, 1-amino-8-naphthol-3,6- or 4,6-disulfonic acid, 2-methyl or methoxyaniline, 1- amino-2-methoxy-5-acetylaminobenzene, N-methyl- or ethyl-aniline, 3-methyl-N-methyl- or ethylaniline, and the like.

Examples of the compound (VII) are 1-aminobenzene-2-, 3- or 4-sulfonic acid, 2-amino-4- or 5-sulfobenzoic acid, 4-amino-2-sulfobenzoic acid, 4-aminotoluene-2- or 3-sulfonic acid, 2-aminotoluene-4- or 5-sulfonic acid, 2-aminotoluene-4-carboxylic acid, 3-amino-4-chlorobenzenesulfonic acid, 2-aminoanisole-4- or 5-sulfonic acid, 4-aminoanisole-2- or 3-sulfonic acid, 3- or 4-chloro-2-aminotoluene-5- sulfonic acid, 5-chloro-2aminotoluene-3- or 4-sulfonic acid, 6-chloro-2- or 3-aminotoluene-4-sulfonic acid, 1-aminobenzene-2,5-, 2,4- or 3,5-disulfonic acid, 2-aminotoluene-3,5-, 4,5- or 4,6-disulfonic acid, 4-aminotoluene-2,5-disulfonic acid, 2-aminonaphthalene-5-, 6-, 7- or 8-sufonic acid, 1-aminonaphthalene-2-, 3-, 4-, 5-, 6-, 7- or 8-sulfonic acid, 2-aminonaphthalene-4,8-, 6,8-, 1,5-, 1,7-, 5,7-, 3,6-, 3,7- or 4,7-disulfonic acid, 1-aminonaphthalene-2,4-, 2,5-, 3,6-, 3,7-, 3,8-, 4,6-, 4,7-, 4,8-, 5,7- or 6,8-disulfonic acid, 2-aminonaphthalene-3,6,8-, 4,6,8- or 1,5,7-trisulfonic acid, 1-aminonaphthalene-2,4,7-, 2,4,8-, 3,5,7-, 3,6,8- or 4,6,8-trisulfonic acid and the like.

Examples of the compounds (VIII) and (IX) are aniline, 3-methyl-, methoxy, ureido-, acetylamine-, benzoylamino-, β-carboxyethylcarbonylamino- or acryloylamino-aniline, 2,5-dimethyl-, diethyl-, dimethoxy- or diethoxy-aniline, 5-methyl-2-methoxy- or ethoxy-aniline, 5-acetyl-2-methylaniline, 4-acetylamino-2-axinobenzenesulfonic acid, 1-aminonaphthalene, 1- aminonaphthalene-2-, 6- or 7-sulfonic acid, 1-amino-2-methoxy or ethoxynaphthalene-6- or 7-sulfonic acid, 2-methyl or methoxyaniline, 2,3- or 3,5-dimethylaniline, 1-amino-2-methoxy-5-acetylaminoaniline and the like.

Examples of the compound (X) ar 1-amino-8-naphthol-3,6- or 4,6-disulfonic acid, 2-amino-8-naphthol-3,6-disulfonic acid, 2- or 3-amino-5-naphthol-7-sulfonic acid, 2-amino-5-naphthol-1,7-disulfonic acid, 2- or 3-methylamino-5-naphthol-7-sulfonic acid and the like.

All the starting compounds described above may be used in free acid form or a salt such as alkali metal and alkaline earth metal salt depending on the reaction conditions.

After completion of the reaction, the desired polyazo compound-containing reaction mixture may be formed into a liquid commercial product, if desired, after removing any inorganic salts and with the addition of a stabilizer or a dyeing improver. The reaction mixture or liquid product formed therefrom may be subjected to evaporation or spray-drying, thereby obtaining a powdery commercial product. Alternatively, according to a conventional manner, the reaction mixture ma/ formed into either a liquid or powdery commercial product: through a salting-out using an electrolyte.

The polyazo compound (I) in accordance with the present invention may be in free acid form or preferably in the form of an alkali metal or alkaline earth metal salt such as sodium or potassium salt.

The polyazo compound (I) of the present invention is fiber-reactive and useful for dyeing or printing hydroxyl group-containing and amide group-containing materials in a fibrous form including unmixed or mixed fiber spinning.

The hydroxyl group-containing materials include natural or synthetic hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose containing fiber materials are mixed fiber materials such as cellulose/polyester, cellulose/wool, cellulose/acryl and the like.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from the conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like.

In carrying out the printing method, a color paste can be prepared using a stock paste or emulsion paste such as sodium alginate, starch ether or the like, and an alkali such as sodium carbonate, sodium hydrogencarbonate, sodium trichloroacetate, the corresponding potassium salts and alkali-liberating compounds such as alkaline earth metal compounds, if desired, together with a printing auxiliary agent such as urea or a dispersant. Fibers may be printed with the color paste, followed by heat treatment particularly in the presence of steam, thereby performing the desired printing.

In the cold-pad-batch-up method, a padding liquor can be prepared using sodium hydroxide alone or in a mixture thereof with sodium silicate, sodium carbonate, trisodium phosphate or the like as an acid binding agent, if desired, together with a hydrotropic agent such as urea or a penetrant. Fibers may be padded with the padding liquor obtained, batched up on a roller, allowed to stand for 3 hours or over night and then subjected to after-treatments such as washing with water and drying, thereby performing the desired padding.

The polyazo compound (I) of the present invention is characterized by excellent dye performance in the dyeing and printing of fiber materials, particularly cellulose fiber materials. The polyazo compound (I) exhibits high exhaustion and fixing percentages and extremely excellent build-up, level dyeing and washing-off properties, and has almost no affect on the dyeing even when changes are made in dyebath conditions such as temperature, bath ratio, concentration of inorganic salts and the like. The polyazo compound (I) can also be characterized by the products dyed or printed using it, which products are excellent in fastness properties such as fastness to light, perspiration-light, perspiration, acid-hydrolysis, washing and chlorine.

The present invention is illustrated in more detail with reference to the following Examples, which are only illustrative, but not limitative. In Examples, all parts and % are by weight.

EXAMPLE 1

2-Naphthylamine-3,6,8-trisulfonic acid (19.2 parts) was diazotized in a conventional manner, and coupled with 5-methyl-2-methoxyaniline (6.85 parts) to obtain a monoazo intermediate compound.

On the other hand, 1-amino-8-hydroxynaphthalene-3,6-disulfonic acid (16.0 parts) was subjected to a first condensation with cyanuric chloride (9.25 parts), followed by a second condensation with 1-aminobenzene-4-β-sulfatoethylsulfone (14.1 parts), and then a third condensation with 1-aminobenzene-3-β-sulfatoethylsulfone (14.1 parts) at 60° to 70° C. within a pH of 4 to 5, thereby obtaining a condensate.

The above monoazo intermediate compound was diazotized in a conventional manner, and coupled with the condensate, and the reaction mixture was subjected to salting-out with sodium chloride. The precipitate was collected on a filter, and then dried to obtain a bisazo compound of the following formula in a free acid form.

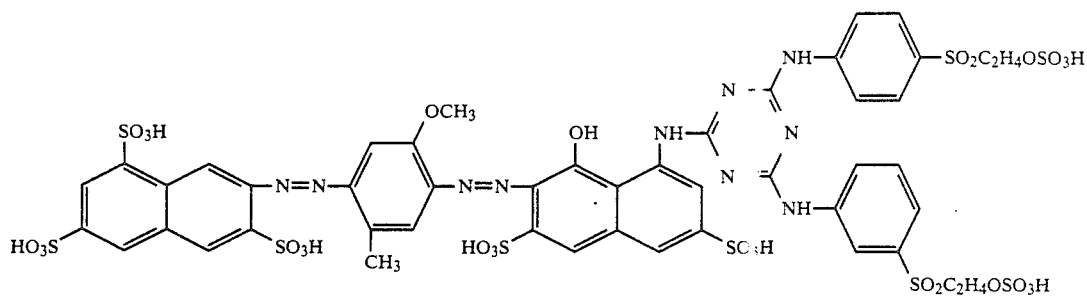

(λmax 610 nm)

The bisazo compound obtained above (0.3 part) was dissolved in water (200 parts), and cotton (10 parts) and sodium sulfate (8 parts) were added thereto. The bath was heated to 60° C, and then sodium carbonate (4 parts) was added thereto. Dyeing was continued for 1 hour at that temperature. The cotton was washed with water and soaped to obtain a dyed product excellent in fastness properties and dye performances. Even when the dyebath conditions including temperature, bath ratio and salt concentration were varied to some extent, each dyeing showed superior reproducibility.

EXAMPLE 2

Example 1 was repeated, except that 2-naphthylamine-3,6,8-trisulfonic acid, 5-methyl-2-methoxyaniline, 1-amino-8-hydroxynaphthalene-3,6-disulfonic acid, 1-aminobenzene-4-β-sulfatoethylsulfone and 1-aminobenzene-3-β-sulfatoethylsulfone were replaced by the compounds shown in the columns A, B, C, D and E of the following table respectively, which are represented by the formulas (IV-1), (IV-2), (IV-3), (II) and (III), respectively, to obtain the corresponding bisazo compound. Using the bisazo compound obtained, dyeing was carried out in the same manner as in Example 1 to obtain a dyed product of a shade as shown in the column F of the following table.

TABLE

| Run No. | A Compound of Formula (IV-1) | B Compound of Formula (IV-2) | C Compound of Formula (IV-3) | D Compound of Formula (II) | E Compound of Formula (III) | F Shade |
|---|---|---|---|---|---|---|
| 1 | 2-Naphthylamine-3,6,8-trisulfonic acid | 5-Methyl-2-methoxyaniline | 1-Amino-8-hydroxynaphthalene-3,6-disulfonic acid | 1-Aminobenzene-3-β-sulfatoethylsulfone | 1-Aminobenzene-3-β-sulfatoethylsulfone | Blue |
| 2 | 2-Naphthylamine-3,6,8-trisulfonic acid | 5-Methyl-2-methoxyaniline | 1-Aminohydroxynaphthalene-3,6-disulfonic acid | 1-N-Ethylaminobenzene-3-β-sulfatoethylsulfone | 1-Aminobenzene-3-β-sulfatoethylsulfone | Blue |
| 3 | 2-Naphthylamine-3,6,8-trisulfonic acid | 5-Methyl-2-methoxyaniline | 1-Amino-8-hydroxynaphthalene-3,6-disulfonic acid | 1-N-Ethylaminobenzene-4-β-sulfatoethylsulfone | 1-Aminobenzene-3-β-sulfatoethylsulfone | Blue |
| 4 | 2-Naphthylamine-3,6,8-trisulfonic acid | 5-Methyl-2-methoxyaniline | 1-Amino-8-hydroxynaphthalene-3,6-disulfonic acid | 1-N-Methylaminobenzene-3-β-sulfatoethylsulfone | 1-Aminobenzene-4-β-sulfatoethylsulfone | Blue |
| 5 | 2-Naphthylamine-3,6,8-trisulfonic acid | 5-Methyl-2-methoxyaniline | 1-Amino-8-hydroxynaphthalene-3,6-disulfonic acid | 1-Aminobenzene-4-β-sulfatoethylsulfone | 1-Aminobenzene-4-β-sulfatoethylsulfone | Blue |
| 6 | 2-Naphthylamine-3,6,8-trisulfonic acid | 5-Methyl-2-methoxyaniline | 1-Amino-8-hydroxynaphthalene-3,6-disulfonic acid | 1-Aminobenzene-4-β-sulfatoethylsulfone | 1-Amino-2-methoxybenzene-3-β-sulfatoethylsulfone | Blue |
| 7 | 2-Naphthylamine-4,6,8-trisulfonic acid | 5-Methyl-2-methoxyaniline | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 8 | 2-Naphthylamine-4,8-disulfonic acid | 5-Methyl-2-methoxyaniline | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |

TABLE-continued

| Run No. | A Compound of Formula (IV-1) | B Compound of Formula (IV-2) | C Compound of Formula (IV-3) | D Compound of Formula (II) | E Compound of Formula (III) | F Shade |
|---|---|---|---|---|---|---|
| 9 | 2-Naphthylamine-3,6-disulfonic acid | 2,5-Dimethylaniline | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 10 | 2-Naphthylamine-6,8-disulfonic acid | 2,5-Dimethoxyaniline | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 11 | 2-Naphthylamine-5,7-disulfonic acid | 3-Ureido-aniline | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 12 | 2-Naphthylamine-3,6,8-trisulfonic acid | 3-Ureido-aniline | 1-Amino-8-hydroxynaphthalene-4,6-disulfonic acid | 1-Aminobenzene-4-β-sulfatoethylsulfone | 1-Aminobenzene-3-β-sulfatoethylsulfone | Reddish blue |
| 13 | Aniline-2,5-disulfonic acid | 5-Methyl-2-methoxyaniline | 2-Amino-5-naphthol-7-sulfonic acid | 1-Aminobenzene-4-β-sulfatoethylsulfone | 1-Aminobenzene-3-β-sulfatoethylsulfone | Violet |
| 14 | Aniline-4-sulfonic acid | 1-Amino-2-methoxynaphthalene-6-sulfonic acid | 2-Amino-5-naphthol-7-sulfonic acid | 1-Aminobenzene-4-β-sulfatoethylsulfone | 1-Aminobenzene-3-β-sulfatoethylsulfone | Reddish blue |
| 15 | Aniline-3-sulfonic acid | 1-Naphthylamine-2-sulfonic acid | 2-Amino-5-naphthol-7-sulfonic acid | 1-Aminobenzene-4-β-sulfatoethylsulfone | 1-Aminobenzene-3-β-sulfatoethylsulfone | Reddish blue |
| 16 | 4-Methylaniline-2-sulfonic acid | 1-Amino-2-methoxynaphthalene-7-sulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 17 | 4-Methoxyaniline-2-sulfonic acid | 1-Naphthylamine-2-sulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Bluish Violet |
| 18 | 5-(p-Sulfophenylazo)-2-aminobenzenesulfonic acid | | 2-Amino-5-naphthol-1,7-disulfonic acid | 1-Aminobenzene-4-β-sulfatoethylsulfone | 1-Aminobenzene-3-β-sulfatoethylsulfone | Red |
| 19 | 5-(p-Sulfophenylazo)-2-aminobenzenesulfonic acid | | 2-Methylamino-5-naphthol-7-sulfonic acid | 1-Aminobenzene-4-β-sulfatoethylsulfone | 1-Aminobenzene-3-β-sulfatoethylsulfone | Red |
| 20 | 2-Naphthylamine-4,8-disulfonic acid | 1-Amino-2-ethoxynaphthalene-6-sulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 21 | 2-Naphthylamine-4,8-disulfonic acid | 1-Naphthylamine-2-sulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 22 | 2-Naphthylamine-3,6,8-trisulfonic acid | 2,5-Dimethylaniline | 2-Amino-5-naphthol-1,7-disulfonic acid | 1-Aminobenzene-4-β-sulfatoethylsulfone | 1-Aminobenzene-3-β-sulfatoethylsulfone | Violet |
| 23 | 2-Naphthylamine-3,6,8-trisulfonic acid | 2,5-Dimethoxyaniline | 3-Amino-5-naphthol-7-sulfonic acid | 1-Aminobenzene-4-β-sulfatoethylsulfone | 1-Aminobenzene-3-β-sulfatoethylsulfone | Blue |
| 24 | 2-Naphthylamine-3,6,8-trisulfonic acid | 2-Methoxy-5-acetylaminoaniline | 2-Amino-5-naphthol-7-sulfonic acid | 1-Aminobenzene-4-β-sulfatoethylsulfone | 1-Aminobenzene-3-β-sulfatoethylsulfone | Blue |
| 25 | 2-Naphthylamine-3,6,8-trisulfonic | 5-Acetylamino-2-methoxyaniline | 1-Amino-8-hydroxynaphthalene-3,6- | 1-Aminobenzene-4-β-sulfatoethyl- | 1-Aminobenzene-3-β-sulfato- | Blue |

TABLE-continued

| Run No. | A Compound of Formula (IV-1) | B Compound of Formula (IV-2) | C Compound of Formula (IV-3) | D Compound of Formula (II) | E Compound of Formula (III) | F Shade |
|---|---|---|---|---|---|---|
| | acid | | disulfonic acid | sulfone | ethylsulfone | |
| 26 | 2-Naphthylamine-1-sulfonic acid | 1-Naphthylamine-2-sulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Reddish blue |
| 27 | 2-Naphthylamine-1,5,7-trisulfonic acid | 5-Methyl-2-methoxyaniline | 1-Amino-8-hydroxynaphthalene-3,6-disulfonic acid | 1-Aminobenzene-4-β-sulfatoethylsulfone | 1-Aminobenzene-3-β-sulfatoethylsulfone | Blue |
| 28 | 2-Naphthylamine-3,6,8-trisulfonic acid | 5-Methyl-2-methoxyaniline | 1-Amino-8-hydroxynaphthalene-3,6-disulfonic acid | 2-Aminonaphthalene-6-β-sulfatoethylsulfone-1-sulfonic acid | 1-Aminobenzene-3-β-sulfatoethylsulfone | Blue |
| 29 | 2-Naphthylamine-3,6,8-trisulfonic acid | 5-Methyl-2-methoxyaniline | 1-Amino-8-hydroxynaphthalene-3,6-disulfonic acid | 2-Aminonaphthalene-8-β-sulfatoethylsulfone-6-sulfonic acid | 1-Aminobenzene-3-β-sulfatoethylsulfone | Blue |
| 30 | 2-Naphthylamine-3,6,8-trisulfonic acid | 5-Methyl-2-methoxyaniline | 1-Amino-8-hydroxynaphthalene-3,6-disulfonic acid | 2-Aminonaphthalene-8-β-sulfatoethylsulfone | 1-Aminobenzene-3-β-sulfatoethylsulfone | Blue |
| 31 | 2-Naphthylamine-3,6,8-trisulfonic acid | 5-Methyl-2-methoxyaniline | 1-Amino-8-hydroxynaphthalene-3,6-disulfonic acid | 1-Aminobenzene-4-vinylsulfone | 1-Aminobenzene-3-β-sulfatoethylsulfone | Blue |
| 32 | 2-Naphthylamine-3,6,8-trisulfonic acid | 5-Methyl-2-methoxyaniline | 1-Amino-8-hydroxynaphthalene-3,6-disulfonic acid | 1-Aminobenzene-2-β-sulfatoethylsulfone | 1-Aminobenzene-3-β-sulfatoethylsulfone | Blue |

EXAMPLE 3

2,4-Diaminobenzenesulfonic acid (4.70 parts) was condensed with cyanuric chloride (4.61 parts) in a known manner, and then condensed with 1-aminobenzene-4-β-sulfatoethylsulfone (6.95 parts). The resulting condensate was diazotized in a conventional manner, and then coupled under strong acid conditions with 1-amino-8-hydroxynaphthalene-3,6-disulfonic acid (7.73 parts). The resulting monoazo intermediate compound was coupled with the diazonium salt of 2-aminonaphthalene-1,5-disulfonic acid (7.58 parts). Ultimately, the resulting bisazo intermediate compound was condensed with 1-aminobenzene-3-β-sulfatoethylsulfone (6.95 parts) at 70° to 80° C. within a pH of 4 to 5. The reaction mixture was salted out with sodium chloride to obtain a bisazo compound of the following formula in a free acid form.

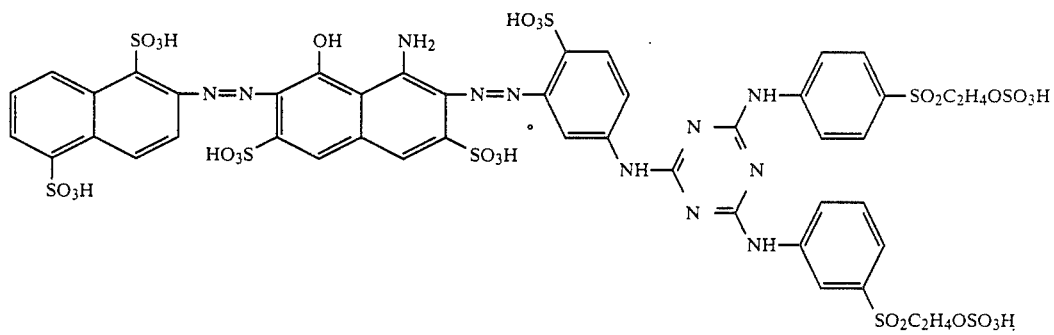

(λmax 610 nm)

The bisazo compound obtained (0.3 part) was dissolved in water (200 parts), and cotton (10 parts) and sodium sulfate (8 parts) were added thereto. The bath was heated to 60° C., and then sodium carbonate (4 parts) was added thereto. Dyeing was continued for 1 hour at that temperature. The cotton taken out was washed with water and then soaped to obtain a dyed product excellent in fastness properties and dye performances.

The above dyeing procedure was repeated, except that dyebath conditions including temperature, bath ratio and salt concentration were varied to some extent, thereby resulting in superior reproducibility.

EXAMPLE 4

Example 3 was repeated, except that the 2-naphthylamine-1,5-disulfonic acid, 2,4-diaminobenzenesulfonic acid, 1-amino-8-hydroxynaphthalene-3,6-disulfonic acid, 1-aminobenzene-4-β-sulfatoethylsulfone and 1-aminobenzene-3-β-sulfatoethylsulfone were replaced by the compounds shown in the columns A, B, C, D and E of the following table, respectively, which are represented by the formulas (V-1), (V-3), (V-2), (II) and (III), respectively, to obtain the corresponding bisazo compound. Using the bisazo compound obtained, dyeing was carried out in the same manner as in Example 3 to obtain a dyed product of a shade as shown in the column F of the following table.

TABLE

| Run No. | A Compound of Formula (V-1) | B Compound of Formula (V-3) | C Compound of Formula (V-2) | D Compound of Formula (II) | E Compound of Formula (III) | F Shade |
|---|---|---|---|---|---|---|
| 1 | 2-Naphthylamino-1,5-disulfonic acid | 2,4-Diaminobenzenesulfonic acid | 1-Amino-8-hydroxynaphthalene-3,6-disulfonic acid | 1-Aminobenzene-3-β-sulfatoethylsulfone | 1-Aminobenzene-3-β-sulfatoethylsulfone | Navy Blue |
| 2 | 2-Naphthylamino-1,5-disulfonic acid | 2,4-Diaminobenzenesulfonic acid | 1-Amino-8-hydroxynaphthalene-3,6-disulfonic acid | 1-N-Ethylaminobenzene-3-β-sulfatoethylsulfone | 1-Aminobenzene-3-β-sulfatoethylsulfone | Navy Blue |
| 3 | 2-Naphthylamino-1,5-disulfonic acid | 2,4-Diaminobenzenesulfonic acid | 1-Amino-8-hydroxynaphthalene-3,6-disulfonic acid | 1-N-Ethylaminobenzene-4-β-sulfatoethylsulfone | 1-Aminobenzene-3-β-sulfatoethylsulfone | Navy Blue |
| 4 | 2-Naphthylamino-1,5-disulfonic acid | 2,4-Diaminobenzenesulfonic acid | 1-Amino-8-hydroxynaphthalene-3,6-disulfonic acid | 1-N-Methylaminobenzene-3-β-sulfatoethylsulfone | 1-Aminobenzene-4-β-sulfatoethylsulfone | Navy Blue |
| 5 | 2-Naphthylamino-1,5-disulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-4-β-sulfatoethylsulfone | Navy Blue |
| 6 | 2-Naphthylamine-1,5-disulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Amino-2-methoxybenzene-3-β-sulfatoethylsulfone | Navy blue |
| 7 | 2-Naphthylamine-1,5-disulfonic acid | 2,4-Diaminobenzenesulfonic acid | 1-Amino-8-hydroxynaphthalene-3,6-disulfonic acid | 1-Amino-2-methoxy-5-methylbenzene-4-β-sulfatoethylsulfone | 1-Amino-4-methoxybenzene-3-β-sulfatoethylsulfone | Navy blue |
| 8 | 2-Naphthylamine-1,5-disulfonic acid | 2,4-Diaminobenzenesulfonic acid | 1-Amino-8-hydroxynaphthalene-3,6-disulfonic acid | 1-Aminobenzene-2-β-sulfatoethylsulfone | 1-Aminobenzene-3-β-sulfatoethylsulfone | Navy blue |
| 9 | 2-Aminonaphthalene-1,5,7-trisulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 10 | 2-Aminonaphthalene-3,6,8-trisulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 11 | 2-Aminonaphthalene-1-sulfonic acid | 2,4-Diaminobenzenesulfonic acid | 1-Amino-8-hydroxynaphthalene-3,6-disulfonic acid | 1-Amino-2-sulfobenzene-4-β-sulfatoethylsulfone | 1-Aminobenzene-3-β-sulfatoethylsulfone | Navy blue |
| 12 | Aniline-2-sulfonic acid | 2,4-Diaminobenzenesulfonic acid | 1-Amino-8-hydroxynaphthalene-3,6-disulfonic acid | 1-Amino-2-sulfobenzene-5-β-sulfatoethylsulfone | 1-Aminobenzene-3-β-sulfatoethylsulfone | Navy blue |
| 13 | Aniline-2,5-disulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 14 | 1-Aminonaphthalene-2-sulfonic acid | 2,4-Diaminobenzenesulfonic acid | 1-Amino-8-hydroxynaphthalene-3,6- | 1-Aminobenzene-4-β-sulfatoeth- | 1-Aminobenzene-3-β-sulfatoeth- | Navy blue |

TABLE-continued

| Run No. | A Compound of Formula (V-1) | B Compound of Formula (V-3) | C Compound of Formula (V-2) | D Compound of Formula (II) | E Compound of Formula (III) | F Shade |
|---|---|---|---|---|---|---|
| | | | disulfonic acid | ylsulfone | ylsulfone | |
| 15 | 2-Aminonaphthalene-3,6-disulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 16 | 4-Methylaniline-2-sulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 17 | 4-Methoxyaniline-2-sulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 18 | Aniline-2,4-disulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 19 | Anthraniline acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 20 | 5-Chloro-2-aminotoluene-3-sulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 21 | 2-Naphthylamine-1,5-disulfonic acid | 2,4-Diaminobenzenesulfonic acid | 1-Amino-8-hydroxynaphthalene-4,6-disulfonic acid | 1-Aminobenzene-4-β-sulfatoethylsulfone | 1-Aminobenzene-3-β-sulfatoethylsulfone | Reddish navy blue |
| 22 | 2-Naphthylamine-1,5-disulfonic acid | 2,5-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Yellowish navy blue |
| 23 | 2-Naphthylamine-1,5-disulfonic acid | 2,5-Diaminobenzene-1,4-disulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Yellowish navy blue |
| 24 | 2-Naphthylamine-1,5-disulfonic acid | 2,4-Diaminobenzene-1,5-disulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 25 | 2-Naphthylamine-1,5-disulfonic acid | 2,4-Diaminobenzenesulfonic acid | 1-Amino-8-hydroxynaphthalene-3,6-disulfonic acid | 2-Aminonaphthalene-6-β-sulfatoethylsulfone-1-sulfonic acid | 1-Aminobenzene-3-β-sulfatoethylsulfone | Navy blue |
| 26 | 2-Naphthylamine-1,5-disulfonic acid | 2,4-Diaminobenzenesulfonic acid | 1-Amino-8-hydroxynaphthalene-3,6-disulfonic acid | 2-Aminonaphthalene-8-β-sulfatoethylsulfone | 1-Amino-2-methoxybenzene-5-β-sulfatoethylsulfone | Navy blue |

EXAMPLE 5

Example 3 was repeated, except that 1-amino-8-hydroxynaphthalene-3,6-disulfonic acid was coupled first with diazonium salt of 2-aminonaphthalene-1,5-disulfonic acid, and then with the diazonium salt of the condensate, thereby obtaining a bisazo compound of the following formula in a free acid form.

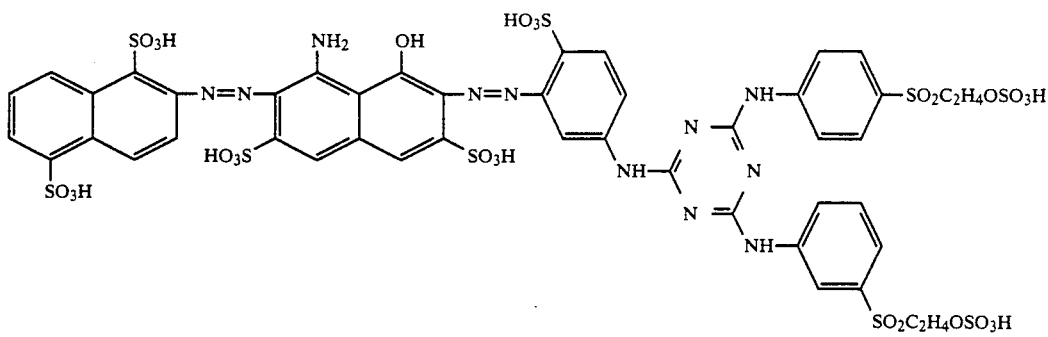

(λmax 610 nm)

Using the bisazo compound obtained above, dyeing was carried out in the same manner as in Example 3 to obtain desired results.

EXAMPLE 6

Using the starting compounds as shown in Example 4, Example 5 was repeated to obtain the corresponding bisazo compound, which showed desirable results in dyeing similar to those of Example 3.

EXAMPLE 7

In order to obtain bisazo compounds other than those obtained in Example 6, Example 5 was repeated, except that the 2-naphthylamine-1,5-disulfonic acid, 2,4-diaminobenzenesulfonic acid, 1-amino-8-hydroxynaphthalene-3,6-disulfonic acid, 1-aminobenzene-4-β-sulfatoethylsulfone and 1-aminobenzene-3-β-sulfatoethylsulfone were replaced by the compounds in the columns A, B, C, D and E of the following table, respectively, which represented by the formulas (V-1), (V-3), (V-2), (II) and (III), respectively, thereby obtaining the corresponding bisazo compound, which gave a dyed product of the shade as shown in the column F of the following table.

TABLE

| Run No. | A Compound of Formula (V-1) | B Compound of Formula (V-3) | C Compound of Formula (V-2) | D Compound of Formula (II) | E Compound of Formula (III) | F Shade |
|---|---|---|---|---|---|---|
| 1 | 4-Aminobenzenesulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 2 | 2-Aminonaphthalene-4,8-disulfonic acid | 2,4-Diaminobenzenesulfonic acid | 1-Amino-8-hydroxynaphthalene-3,6-disulfonic acid | 1-Aminobenzene-4-β-sulfatoethylsulfone | 1-Aminobenzene-3-β-sulfatoethylsulfone | Navy blue |
| 3 | 2-Aminonaphthalene-6,8-disulfonic acid | 2,4-Diaminobenzenesulfonic acid | 1-Amino-8-hydroxynaphthalene-3,6-disulfonic acid | 1-N-Methylaminobenzene-3-β-sulfatoethylsulfone | 1-Aminobenzene-3-β-sulfatoethylsulfone | Navy blue |
| 4 | 2-Aminonaphthalene-5,7-disulfonic acid | 2,4-Diaminobenzenesulfonic acid | 1-Amino-8-hydroxynaphthalene-3,6-disulfonic acid | 1-Amino-2-methoxy-5-methylbenzene-4-β-sulfatoethylsulfone | 1-Amino-2-methoxybenzene-5-β-sulfatoethylsulfone | Navy blue |
| 5 | 3-Aminobenzenesulfonic acid | 2,5-Diaminobenzenesulfonic acid | 1-Amino-8-hydroxynaphthalene-4,6-disulfonic acid | 2-Aminonaphthalene-6-β-sulfatoethylsulfone-1-sulfonic acid | 1-Aminobenzene-4-β-sulfatoethylsulfone | Navy blue |
| 6 | 2-Aminonaphthalene-1,5-disulfonic acid | 2-Amino-5-aminoethylnaphthalene-1-sulfonic acid | 1-Amino-8-hydroxynaphthanele-3,6-disulfonic acid | 1-Aminobenzene-4-β-sulfatoethylsulfone | 1-Aminobenzene-3-β-sulfatoethylsulfone | Navy blue |
| 7 | 2-Aminonaphthalene-1,5-disulfonic acid | 2-Amino-4-N-methylaminobenzenesulfonic acid | 1-Amino-8-hydroxynaphthanele-3,6-disulfonic acid | 1-Aminobenzene-4-β-sulfatoethylsulfone | 1-Aminobenzene-3-β-sulfatoethylsulfone | Navy blue |
| 8 | 2-Aminonaphthalene-1,5-disulfonic acid | 2-Amino-5-aminomethylnaphthalene-1,7-disulfonic acid | 1-Amino-8-hydroxynaphthanele-3,6-disulfonic acid | 1-Aminobenzene-4-β-sulfatoethylsulfone | 1-Aminobenzene-3-β-sulfatoethylsulfone | Navy blue |
| 9 | 2-Aminonaph- | 6-Amino-3- | 1-Amino-8- | 1-Aminoben- | 1-Aminoben- | Navy |

| Run No. | A Compound of Formula (V-1) | B Compound of Formula (V-3) | C Compound of Formula (V-2) | D Compound of Formula (II) | E Compound of Formula (III) | F Shade |
|---|---|---|---|---|---|---|
| | thalene-1,5-disulfonic acid | methyl-4-aminomethylbenzenesulfonic acid | hydroxynaphthanele-3,6-disulfonic acid | zene-4-β-sulfatoethylsulfone | zene-3-β-sulfatoethylsulfone | blue |
| 10 | 4-Aminobenzenesulfonic acid | 2,4-Diaminobenzenecarboxylic acid | 1-Amino-8-hydroxynaphthanele-3,6-disulfonic acid | 1-Aminobenzene-4-β-sulfatoethylsulfone | 1-Aminobenzene-3-β-sulfatoethylsulfone | Navy blue |

EXAMPLE 8

2-Naphthylamine-3,6,8-trisulfonic acid (19.2 parts) was diazotized in a conventional manner, and then coupled with 5-methyl-2-methoxyaniline (6.85 parts). The resulting monoazo intermediate compound was diazotized, and then coupled with 5-methyl-2-ethoxyaniline (7.55 parts), thereby obtaining a bisazo intermediate compound.

On the other hand, 1-amino-8-hydroxynaphthalene-3,6-disulfonic aid (16.0 parts) was first condensed with cyanuric chloride (9.25 parts), then with 1-aminobenzene-4-β-sulfatoethylsulfone (14.1 parts) and finally with 1-aminobenzene-3-β-sulfatoethylsulfone (14.1 parts) at 60° to 70° C. within a pH of 4 to 5.

The resulting condensate was coupled with a diazonium salt of the above bisazo intermediate compound, followed by a salting-out with sodium chloride, thereby obtaining a desired trisazo compound of the following formula in a free acid form.

hour at that temperature. The cotton taken out was washed with water and then soaped to obtain a dyed product of a greenish navy blue color excellent in fastness properties with excellent dye performance. Even when dyebath conditions including temperature, bath ratio and salt concentration were varied to some extent, each dyeing showed superior reproducibility.

EXAMPLE 9

Example 8 was repeated except that the 2-naphthylamine-3,6 8-trisulfonic acid, 5-methyl-2-methoxyaniline, 5-methyl-2-ethoxyaniline. 1-amino-8-hydroxynaphthalene-3,6-disulfonic acid, 1-aminobenzane-4-β-sulfatoethylsulfone and 1-aminobenzene-3-8-sulfatoethylsulfone were replaced by the compounds as shown in the columns A, B, C, D, E and F of the following table, respectively, which are represented by the formulas (VII), (VIII), (IX), (X)[(i) and (III), to obtain the corresponding triazo compound, which gave a dyed product of a shade as shown in the column G of the follow-

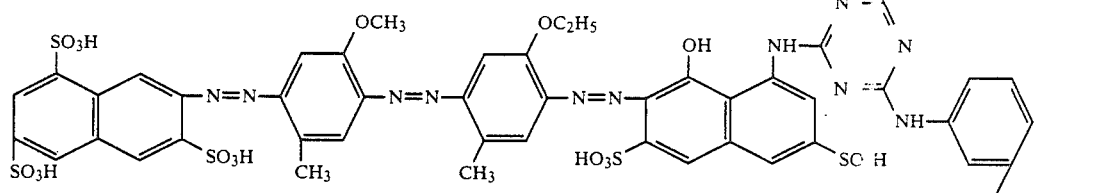

(λmax 565 nm)

The trisazo compound obtained (0.3part) was dissolved in water (200 parts), and cotton (10 parts) and sodium sulfate (8 parts) were added thereto. The bath was heated to 60° C., and then sodium carbonate (4 parts) was added thereto. Dyeing was continued for 1 ing table. In the table. Q means β-sulfatoethylsulfonyl.

Compounds having vinylsulfonyl, β-chloroethylsulfonyl, β-phosphatoethylsulfonyl or β-acetoxyethylsulfonyl in place of the β-sulfatoethylsulfonyl produced the desired corresponding trisazo compound.

TABLE

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 1 | 2-aminobenzene-1,4-disulfonic acid | 3-methylaniline | 2,5-dimethylaniline | 1-amino-8-hydroxy-3,6-disulfonic naphthalene | 4-aminophenyl-Q | 3-aminophenyl-Q | Navy blue |
| 2 | 2-aminobenzene-1,4-disulfonic acid | 2-methoxy-4-acetamidoaniline | 2-methoxy-5-methylaniline | 1-amino-8-hydroxy-3,6-disulfonic naphthalene | 2-amino-4-methoxyphenyl-Q | 3-aminophenyl-Q | Greenish navy blue |
| 3 | 2-aminobenzene-1,4-disulfonic acid | 2-methoxy-5-methylaniline | 2-methoxy-5-methylaniline | 1-amino-8-hydroxy-3,6-disulfonic naphthalene | 4-(ethylamino)phenyl-Q | 3-aminophenyl-Q | Greenish navy blue |
| 4 | 3,5-disulfoaniline | 2-ethoxy-5-methylaniline | 2-methoxy-5-methylaniline | 1-amino-8-hydroxy-3,6-disulfonic naphthalene | 6-amino-2-naphthyl-Q | 4-aminophenyl-Q | Greenish navy blue |
| 5 | 2-aminobenzene-1,4-disulfonic acid | 2,5-dimethylaniline | 2-methoxy-5-methylaniline | 2-amino-8-hydroxy-6-sulfonic naphthalene (with NH2) | 6-amino-1-sulfo-2-naphthyl-Q | 2,5-dimethoxy-4-aminophenyl-Q | Navy blue |

| Run No. | A Compound of Formula (VII) | B Compound of Formula (VIII) | Compound of Formula (IX) | D Compound of Formula (X) | E Compound of Formula (II) | F Compound of Formula (II) | G Shade of cotton |
|---|---|---|---|---|---|---|---|
| 6 | 2-amino-benzenesulfonic acid (ortho-NH₂, SO₃H with HO₃S para) | 1,5-diamino-anthracene-disulfonic acid | 2-amino-4-methyl-anisole | 2-amino-8-hydroxy-naphthalene-1,6-disulfonic acid | 3-aminophenyl-Q | 2,5-diamino-phenyl-Q | Reddish navy blue |
| 7 | 2-amino-4-sulfo-benzenesulfonic acid | 1-amino-naphthalene-7-sulfonic acid | 2-amino-butoxy-benzene | 2-amino-6-hydroxy-naphthalene-sulfonic acid | 4-aminophenyl-Q | 4-aminophenyl-Q | Greenish navy blue |
| 8 | 2-amino-4-sulfo-benzenesulfonic acid | — | 2-amino-4-methyl-anisole | 2-(N-methylamino)-6-hydroxy-naphthalene-sulfonic acid | 4-amino-2-methoxyphenyl-Q | 2-sulfo-4-aminophenyl-Q | Reddish navy blue |
| 9 | 2-amino-4-sulfo-benzenesulfonic acid | " | 2,5-di(n-propoxy)-aniline | 4-amino-5-hydroxy-naphthalene-2,7-disulfonic acid | 2-chloro-5-aminophenyl-Q | 4-aminophenyl-Q | Green |

TABLE-continued

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 10 | 2-aminobenzene-1,4-disulfonic acid ($SO_3H$, $NH_2$, $SO_3H$) | 8-amino-naphthalene-2-sulfonic acid | 2,5-dimethylaniline | 8-amino-1-hydroxynaphthalene-3,6-disulfonic acid | 3-aminophenyl-Q | 4-amino-2,5-dimethylphenyl-Q | Navy blue |
| 11 | 2-amino-benzene-1,4-disulfonic acid | 3-methylaniline | 1-amino-2-naphthalenesulfonic acid | 8-amino-1-hydroxynaphthalene-3,6-disulfonic acid | 2-amino-5-Q-benzoic acid | 3-(N-methylamino)phenyl-Q | Navy blue |
| 12 | 2-amino-4-sulfo-chlorobenzene | 3-methylaniline | 1-amino-2-ethyl-7-naphthalenesulfonic acid | 8-amino-1-hydroxynaphthalene-3,6-disulfonic acid | 2-ethyl-4-amino-phenyl-Q | 4-aminophenyl-Q | Green |
| 13 | 2-aminobenzene-1,4-disulfonic acid | 2-amino-5-acetamido-benzenesulfonic acid | 1-amino-2-ethoxynaphthalene | 2-amino-5-hydroxynaphthalene-1,7-disulfonic acid-NH$_2$ | 6-amino-1-naphthyl-Q | 2-amino-4-Q-benzenesulfonic acid | Navy blue |

TABLE-continued

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 14 | 4-methoxy-2,5-disulfo aniline | 2-methoxy-5-methyl aniline | 1-amino-2-methoxy-7-sulfo naphthalene | 2-amino-8-hydroxy-3,6-disulfo naphthalene | 4-(N-ethylamino)phenyl-Q | 3-(N-ethylamino)phenyl-Q | Green |
| 15 | 2-amino-1,5-disulfo naphthalene | 2-methoxy-5-methyl aniline | 2-methoxy-5-methyl aniline | 2-amino-8-hydroxy-3,6-disulfo naphthalene | 4-amino phenyl-Q | 3-amino phenyl-Q | Navy blue |
| 16 | 2-amino-1,5-disulfo naphthalene | 2-methoxy-5-methoxy aniline | 2-methoxy-5-methoxy aniline | 4-amino-5-hydroxy-2,7-disulfo naphthalene | 4-amino-2,5-dimethoxy phenyl-Q | 3-(N-β-hydroxyethylamino)phenyl-Q | Greenish navy blue |
| 17 | " | " | " | 2-amino-8-hydroxy-3,6-disulfo naphthalene | 4-amino phenyl-Q | 3-(N-β-carbamoylethylamino)phenyl-Q | Greenish navy blue |
| 18 | " | " | " | 2-amino-8-hydroxy-3,6-disulfo naphthalene (1-SO3H) | 4-amino-3-ethoxy phenyl-Q | 3-amino phenyl-Q | Reddish navy blue |

TABLE-continued
| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 19 | " | | 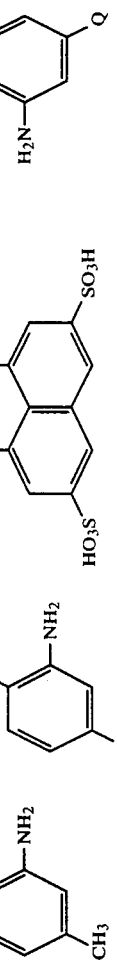 | 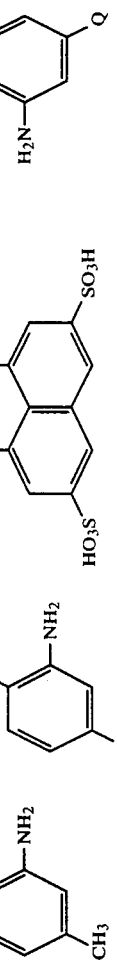 | | | Navy blue |
| 20 | 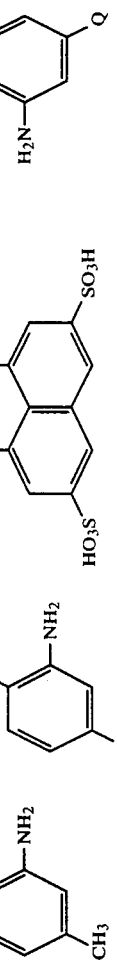 | 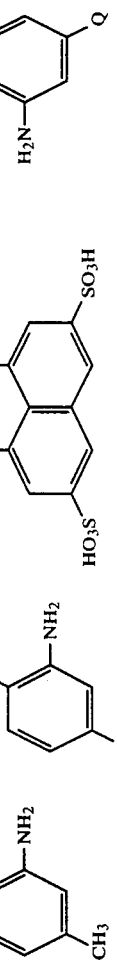 | 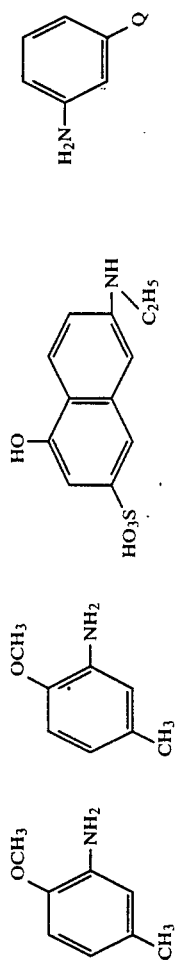 | 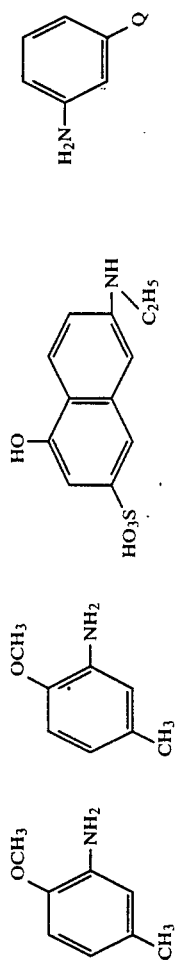 | 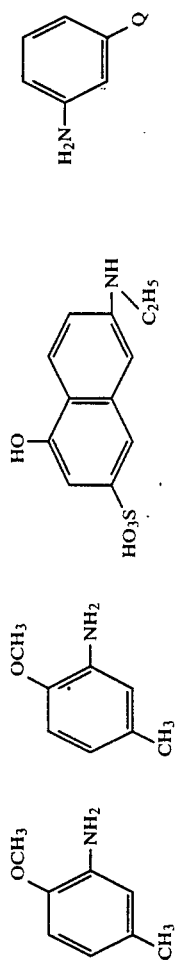 | 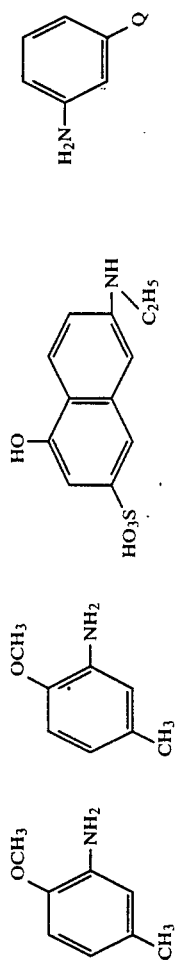 | Reddish navy blue |
| 21 | " | " | 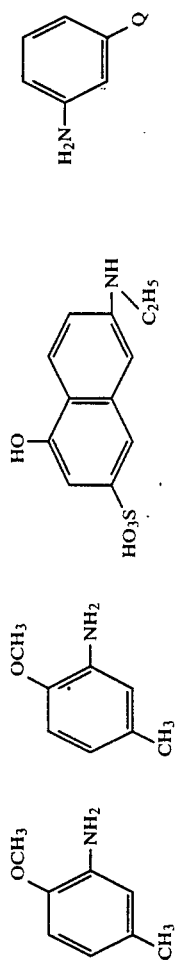 | 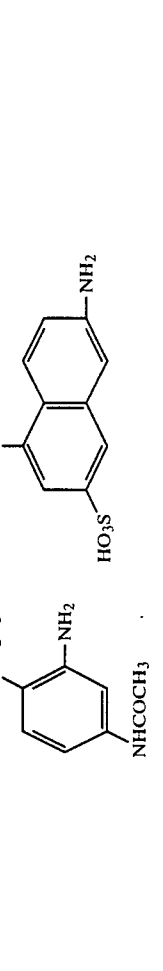 | 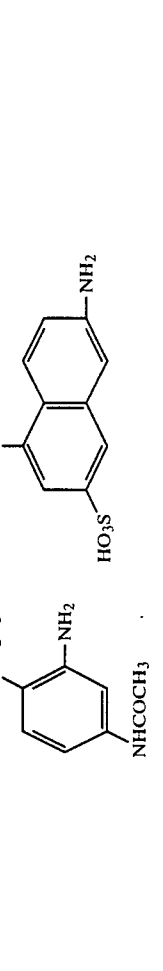 | | Navy blue |
| 22 | " | " | 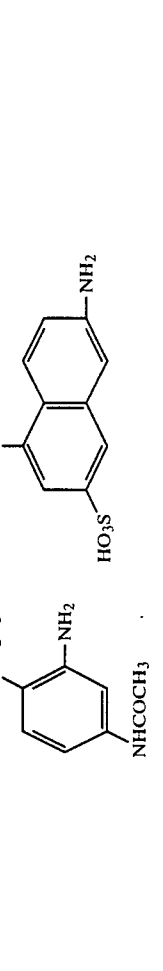 | 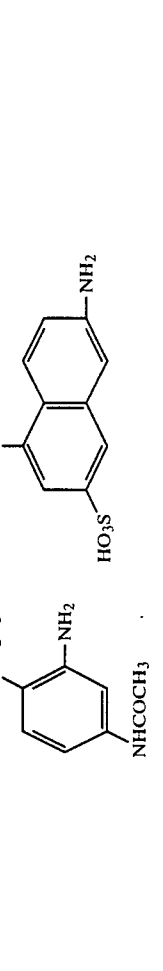 | 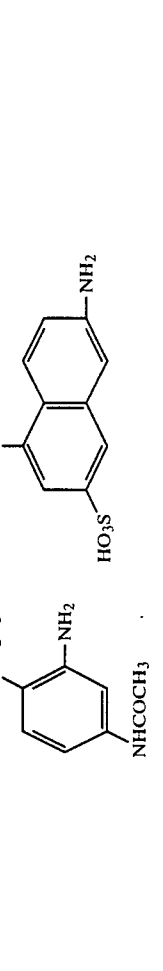 | | Greenish navy blue |
| 23 | " | 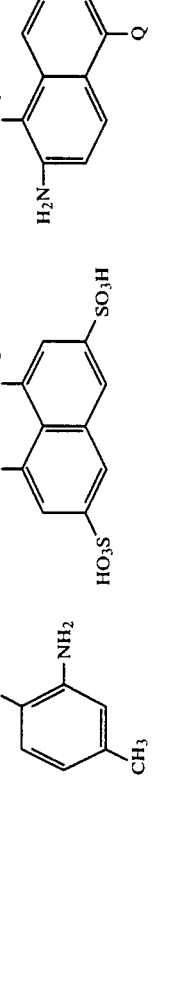 | " | " | 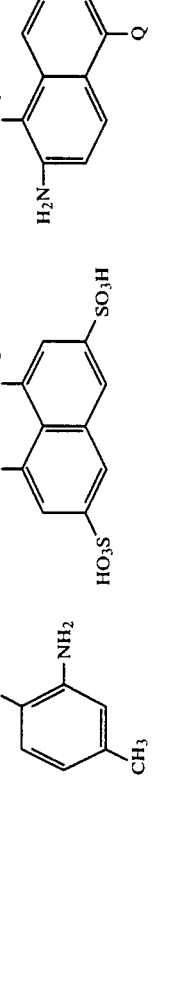 | 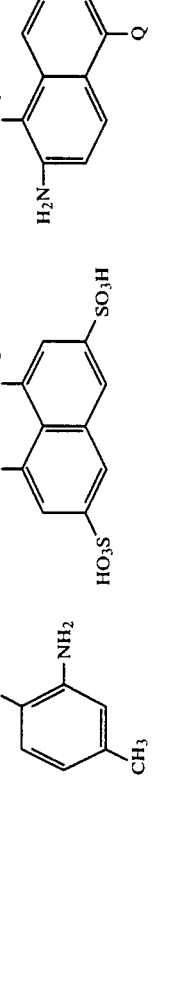 | Navy blue |

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 24 | HO₃S—naphthalene(NH₂)(SO₃H) with HO₃S | | OCH₃, NH₂, CH₃ phenyl | " | | H₂N—phenyl—Q (meta) | Greenish navy blue |
| 25 | " | NH₂, CH₃ phenyl (meta) | OCH₃, NH₂, CH₃ phenyl | HO—naphthalene(NH₂)(SO₃H)(SO₃H) | H₂N—phenyl—Q (para) | H₂N—phenyl—Q (meta) | Greenish navy blue |
| 26 | " | NH₂ phenyl | OCH₃, NH₂ phenyl | " | " | " | Greenish navy blue |
| 27 | NH₂, SO₃H naphthalene with HO₃S | NH₂, CH₃ phenyl (meta) | OCH₃, NH₂, CH₃ phenyl | " | C₂H₅HN—phenyl—Q (para) | H₂N—phenyl—Q (para) | Greenish navy blue |
| 28 | NH₂ naphthalene with HO₃S, HO₃S | CH₃, NH₂, CH₃ phenyl | C₄H₉(n), NH₂, CH₃ phenyl | NH₂, SO₃H, HO naphthalene with HO₃S | H₂N—phenyl—Q | OCH₃, H₂N, OCH₃ phenyl—Q | Navy blue |

TABLE-continued

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 29 | 2-amino-3,6-disulfonaphthalene (with NH₂, SO₃H, HO₃S, HO₃S) | 8-amino-2-sulfonaphthalene | 2-methoxy-5-acetamidoaniline (OCH₃, NH₂, NHCOCH₃) | 2-amino-5-hydroxy-7-sulfo-1-naphthalenesulfonic acid (NH₂, SO₃H, HO, HO₃S) | 3-(methylamino)phenyl-Q (CH₃-HN, Q) | 3-(methylamino)phenyl-Q (CH₃-HN, Q) | Navy blue |
| 30 | 2-amino-1-sulfo-5-sulfonaphthalene (NH₂, SO₃H, HO₃S) | 8-amino-2-sulfonaphthalene | 2-methoxy-5-acetamidoaniline (OCH₃, NH₂, NHCOCH₃) | 2-amino-5-hydroxy-7-sulfonaphthalene (NH₂, HO, HO₃S) | 4-aminophenyl-Q (H₂N, Q) | 3-aminophenyl-Q (H₂N, Q) | Navy blue |
| 31 | 2-amino-1-sulfo-5-sulfonaphthalene (NH₂, SO₃H, HO₃S) | 8-amino-2-sulfonaphthalene | 2-ethoxy-5-methylaniline (OC₂H₅, NH₂, CH₃) | 2-amino-5-hydroxy-7-sulfonaphthalene (NH₂, HO, HO₃S) | " | " | Navy blue |
| 32 | 2-amino-1-sulfo-5-sulfonaphthalene (NH₂, SO₃H, HO₃S) | " | 2-methoxy-5-methylaniline (OCH₃, NH₂, CH₃) | " | " | " | Navy blue |

TABLE-continued

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 33 | 3-amino-2,6-naphthalenedisulfonic acid (HO₃S at 5,6; NH₂, SO₃H) | 8-amino-2-naphthalenesulfonic acid | 4-ethoxy-2-amino-5-acetamidobenzene (OC₂H₅, NH₂, NHCOCH₃) | — | 4-amino-2-methoxyphenol-Q (OCH₃, Q, H₂N) | 4-aminophenyl-Q (H₂N, Q) | Navy blue |
| 34 | " | 5-amino-2-naphthalenesulfonic acid | 4-methoxy-2-amino-5-methylbenzene (OCH₃, NH₂, CH₃) | 4-amino-5-hydroxy-2,7-naphthalenedisulfonic acid | 4-(N-ethylamino)phenyl-Q | 3-(N-ethylamino)phenyl-Q | Green |
| 35 | 3-amino-2,6-naphthalenedisulfonic acid | 8-amino-2-naphthalenesulfonic acid | 2-amino-1,4-dimethylbenzene (CH₃, NH₂, CH₃) | 4-amino-5-hydroxy-2,7-naphthalenedisulfonic acid | 3-amino-phenyl-Q | 3-amino-phenyl-Q | Navy blue |
| 36 | 3-amino-1-naphthalenesulfonic acid (NH₂, SO₃H, HO₃S) | 8-amino-2-naphthalenesulfonic acid | 4-ethoxy-2-amino-5-acetamidobenzene (OC₂H₅, NH₂, NHCOCH₃) | 6-amino-4-hydroxy-2-naphthalenesulfonic acid (NH₂, OH, HO₃S) | 6-amino-2-naphthyl-Q (H₂N, Q) | 4-amino-1-naphthalenesulfonic acid-Q (SO₃H, H₂N, Q) | Navy blue |

TABLE-continued

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 37 | 2-amino-naphthalene-3,6,8-trisulfonic acid derivative (NH₂, SO₃H, HO₃S, HO₃S) | 8-amino-naphthalene-2-sulfonic acid (NH₂, SO₃H) | " | 2-amino-5-hydroxy-naphthalene-7-sulfonic acid (NH₂, HO, HO₃S) | 4-aminophenyl-Q (H₂N—⟨⟩—Q) | 3-aminophenyl-Q (H₂N, Q) | Navy blue |
| 38 | same as 37 | 8-amino-naphthalene-2-sulfonic acid | 2-amino-4-methyl-anisole (OCH₃, NH₂, CH₃) | 4-amino-5-hydroxy-naphthalene-2-sulfonic acid (NH₂, HO, HO₃S) | " | 4-methyl-3-amino-phenyl-Q (CH₃, H₂N, Q) | Green |
| 39 | 6-amino-naphthalene-1,3-sulfonic acid (NH₂, HO₃S, HO₃S) | 3-amino-4-methyl-aniline (NH₂, CH₃) | 1-amino-2-ethyl-naphthalene-7-sulfonic acid (C₂H₅, NH₂, SO₃H) | " | " | 4-aminophenyl-Q (H₂N—⟨⟩—Q) | Green |
| 40 | 2-amino-naphthalene-3,6,8-trisulfonic acid derivative (NH₂, SO₃H, HO₃S, HO₃S) | 2-ethoxy-5-methyl-aniline (OC₂H₅, NH₂, CH₃) | 1-amino-naphthalene-7-sulfonic acid (SO₃H, NH₂) | 2-amino-5-hydroxy-naphthalene-7-sulfonic acid (NH₂, SO₃H, HO, HO₃S) | 4-aminophenyl-Q (H₂N—⟨⟩—Q) | 2-sulfo-4-amino-phenyl-Q (SO₃H, H₂N, Q) | Navy blue |

TABLE-continued

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 41 | " | 2,5-dimethoxyaniline | 2-ethoxy-1-amino-7-naphthalenesulfonic acid | 2-amino-5-hydroxy-1,7-naphthalenedisulfonic acid | 3-aminophenyl-Q | 3-aminophenyl-Q | Navy blue |
| 42 | 2-amino-5-sulfo-naphthalene | 2-methoxy-5-methylaniline | 2-ethyl-1-aminonaphthalene | " | " | 2-amino-4-Q-benzenesulfonic acid | Reddish navy blue |
| 43 | 2-amino-5,7-disulfonaphthalene | 1-amino-7-sulfonaphthalene | 1-amino-7-sulfonaphthalene | 4-amino-5-hydroxy-2,7-naphthalenedisulfonic acid | " | 3-Q-aniline | Navy blue |
| 44 | " | " | 1-amino-2-sulfonaphthalene | 2-amino-5-hydroxy-1,7-naphthalenedisulfonic acid | " | " | Reddish navy blue |

TABLE-continued

| Run No. | A Compound of Formula (VII) | B Compound of Formula (VIII) | C Compound of Formula (IX) | D Compound of Formula (X) | E Compound of Formula (II) | F Compound of Formula (III) | G Shade of cotton |
|---|---|---|---|---|---|---|---|
| 45 | 2-amino-5,8-disulfo naphthalene (HO₃S, NH₂, SO₃H) | 1-amino-6-sulfo naphthalene (NH₂, SO₃H) | 1-amino-2-ethyl naphthalene (C₂H₅, NH₂) | 2-amino-5-hydroxy-7-sulfo naphthalene with SO₃H (NH₂, SO₃H, HO, HO₃S) | 3-amino phenyl-Q (H₂N, Q) | 4-amino phenyl-Q (H₂N, Q) | Greenish navy blue |
| 46 | " | 1-amino-2-sulfo-6-sulfo naphthalene (SO₃H, NH₂, SO₃H) | 1-amino-2-sulfo naphthalene (SO₃H, NH₂) | 1-amino-8-hydroxy-6-sulfo naphthalene (NH₂, HO, HO₃S) | 4-amino phenyl-Q (H₂N, Q) |  | Navy blue |
| 47 | 3-amino-2-sulfo-5,7-disulfo naphthalene (NH₂, SO₃H, HO₃S, HO₃S) | 1-amino-2-ethoxy-7-sulfo naphthalene (OC₂H₅, NH₂, SO₃H) | 1-amino-2-ethoxy-7-sulfo naphthalene (OC₂H₅, NH₂, SO₃H) | 3-amino-4-hydroxy-sulfo naphthalene (NH₂, HO, HO₃S) | " | 2,5-dimethyl-4-amino phenyl-Q (CH₃, Q, CH₃, H₂N) | Navy blue |

EXAMPLE 10

2-Aminonaphthalene-4,8-disulfonic acid (30.3 parts) was diazotized in a conventional manner, and then coupled with 1-aminonaphthalene-7-sulfonic acid (22.3 parts). The monoazo compound obtained was diazotized in a conventional manner, and then coupled with 1-aminonaphthalene-8-sulfonic acid (22.3 parts). All the bisazo intermediate compound obtained was subjected to a first condensation with cyanuric chloride (18.5 parts) at 20° C., followed by second condensation with 1-aminobenzene-3-β-sulfatoethylsulfone (57 parts) at 60° C. The reaction mixture was salted out to precipitate crystals, which were isolated to obtain a bisazo compound of the following formula in a free acid form.

diate compound was subjected to a first condensation with cyanuric chloride (18.5 parts) at 20° C., followed by a second condensation with 1-aminobenzene-4-β-sulfatoethylsulfone (28.5 parts) at 50° C., and then a third condensation with 1-aminobenzene-3-β-sulfatoethylsulfone (28.5 parts) at 80° C. The reaction mixture was salted out to precipitate crystals, which were isolated to obtain a bisazo compound of the following formula in a free acid form.

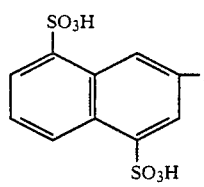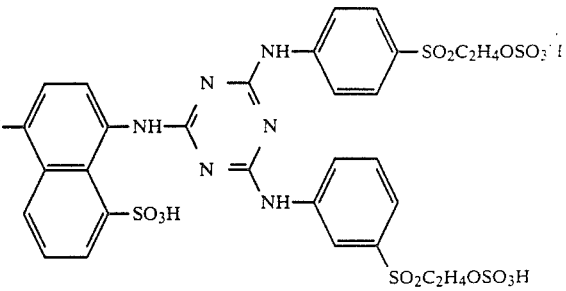

(λmax 415 nm)

The bisazo compound obtained above (0.3 part) was dissolved in water (200 parts), and sodium sulfate (20 parts) and cotton (10 parts) were added thereto. The bath was heated to 60° C., and 20 minutes thereafter, trisodium phosphate (3 parts) was added thereto. Dyeing was continued for 1 hour at that temperature. The cotton taken out was washed with water and then soaped to obtain a dyed product of yellowish brown color excellent in fastness properties.

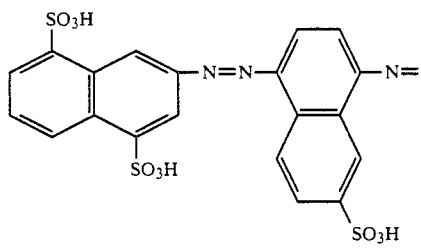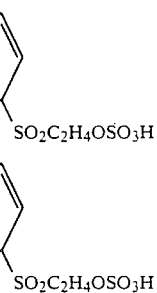

(λmax 485 nm)

The bisazo compound obtained above (each 0.1, 0.3 and 0.6 part) was dissolved in water (200 parts), and sodium sulfate (20 parts) and cotton (10 parts) were added thereto. The bath was heated to 70° C., and 30 minutes thereafter, sodium carbonate (3 parts) was added thereto. Dyeing was continued for 1 hour at that temperature. The cotton taken out was washed with water and soaped to obtain a dyed product of a dark violet color excellent in fastness properties, particularly fastness to chlorine and perspiration-light. It was found that this compound was highly soluble and exhibited excellent build-up and level-dyeing properties with superior reproducibility.

EXAMPLE 11

2-Aminonaphthalene-4,8-disulfonic acid (30.3 parts) was diazotized in a conventional manner, and then coupled with 3-toluidine (10.7 parts). The resulting monoazo compound was diazotized in a conventional manner, and then coupled with 1-aminonaphthalene-8-sulfonic acid (22.3 parts). All the resulting bisazo interme-

EXAMPLE 12

2-Aminonaphthalene-4,8-disulfonic acid (30 parts) was diazotized in a conventional manner, and then coupled with 1-aminonaphthalene-7-sulfonic acid (22.3 parts) also in a conventional manner. The resulting monoazo compound was diazotized in a conventional manner, and then coupled with 3-toluidine (10.7 parts). All the resulting bisazo intermediate compound was subjected to a first condensation with cyanuric chloride (18.5 parts) at 20° C., followed by a second condensation with 1-N-ethylaminobenzene-3-βsulfatoethylsulfone (31.3 parts) at 50° C., and then a third condensation with 1-aminobenzene-3-β-sulfatoethylsulfone (28.5 parts) at 80° C. The reaction mixture was salted out to precipitate crystals, which were isolated to obtain a bisazo compound of the following formula in a free acid form.

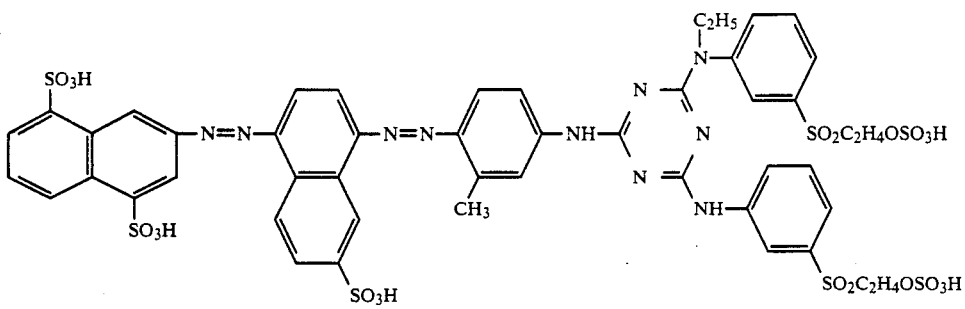

(λmax 470 nm)

The bisazo compound obtained above (0.3 part) was dissolved in (150 parts), and sodium sulfate (10 parts) and (10 parts) were added thereto. The bath was heated 70° C., and 30 minutes thereafter, sodium carbonate parts) was added thereto. Dyeing was continued for 1 hour at that temperature. The cotton taken out was washed with water and soaped to obtain a dyed product of brown color excellent in fastness properties, particularly fastness to chlorine, light and perspiration-light with superior build-up property.

EXAMPLE 13

2-Aminonaphthalene-4,8-disulfonic acid (30.3 parts) was diazotized in a conventional manner, and then coupled with 1-aminonaphthalene-7-sulfonic acid (22.3 parts) also in a conventional manner. The resulting monoazo compound was diazotized in a conventional manner, and then coupled with N-methyl-3-toluidine (12.1 parts). On the other hand, cyanuric chloride (18.5 parts) and 1-N-ethylaminobenzene-4-β-sulfatoethylsulfone (31.3 parts) were allowed to condense each other at 5° C., and the resulting condensate was subjected to a first condensation with the bisazo intermeaidte compound obtained above at 30° C., followed by a second condensation with 1-aminobenzene-4-β-sulfatoethylsulfone (28.5 parts) at 80° C. The reaction mixture was salted out to precipitate crystals, which were isolated to obtain a bisazo compound of the following formula in a free acid form.

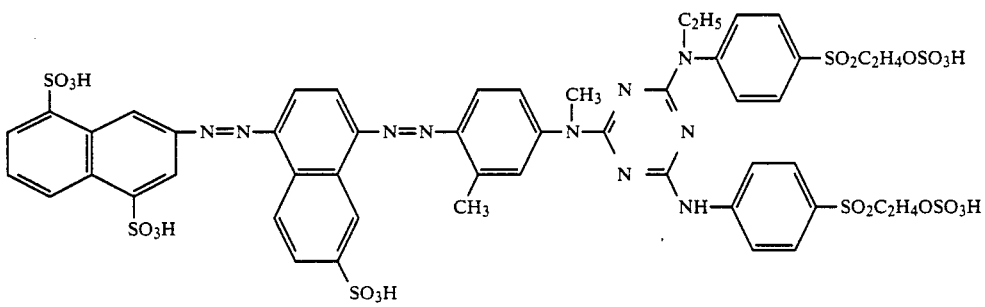

(λmax 435 nm)

The bisazo compound obtained above (each 0.1, 0.3 and 0.6 parts) was dissolved in water (200 parts), and sodium sulfate (10 parts) and cotton (10parts) were added thereto. The bath was heated to 60° C., and sodium carbonate (4 parts) was added thereto. Dyeing was continued for 1 hour at that temperature. The cotton taken out was washed with water and soaped to obtain a dyed product of yellowish brown color excellent in fastness properties, particularly fastness to chlorine, light and perspiration-light.

It was found that the compound was highly soluble and exhibited superior build-up and level-dyeing properties with superior reproducibility.

EXAMPLE 14

In a manner similar to those of Example 10 to 13, using the compounds represented by the formulas (VI-1), (VI-2), (VI-3), (II) and (III) as shown in the following table in place of 2-aminonaphthalene-4,8disulfonic acid, 1-aminonaphthalene-7-sulforic acid, 1-aminonaphthalene-8-sulfonic acid and 1-aminobenzene-3-β-sulfatoethylsulfone, which were used in Example 10, respectively, the corresponding bisazo compound was obtained. Dyeing was carried out using the resulting bisazo compound in a manner similar to those of preceding Examples, thereby obtaining a dyed product of the shade as shown in the following table.

TABLE

| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 1 | 3-amino-naphthalene-1,5-disulfonic acid (NH₂, SO₃H, SO₃H substituted naphthalene) | 1-amino-naphthalene-6-sulfonic acid | 1-amino-naphthalene-8-sulfonic acid | 4-($SO_2C_2H_4OSO_3H$)-aniline ($H_2N$-C₆H₄-$SO_2C_2H_4OSO_3H$) | 3-amino-phenyl-$SO_2C_2H_4OSO_3H$ ($H_2N$ at position with $SO_2C_2H_4OSO_3H$) | Dark Violet |
| 2 | " | 1-amino-naphthalene-7-sulfonic acid | " | 4-(ethylamino)-phenyl-$SO_2C_2H_4OSO_3H$ ($C_2H_5$-HN-C₆H₄-$SO_2C_2H_4OSO_3H$) | 4-amino-3-methoxy-phenyl-$SO_2C_2H_4OSO_3H$ ($H_2N$, $OCH_3$, $SO_2C_2H_4OSO_3H$) | " |
| 3 | " | 1-amino-naphthalene-6-sulfonic acid | " | 6-amino-naphthalene-2-($SO_2C_2H_4OSO_3H$) ($H_2N$, $HO_3SOC_2H_4O_2S$ substituted naphthalene) | 4-amino-phenyl-$SO_2C_2H_4OSO_3H$ ($H_2N$-C₆H₄-$SO_2C_2H_4OSO_3H$) | " |
| 4 | 3-amino-naphthalene-1,5-disulfonic acid | 1-amino-naphthalene-6-sulfonic acid | 1-amino-naphthalene-7-sulfonic acid | 2-amino-naphthalene-5,8-($SO_3H$, $SO_2C_2H_4OSO_3H$) substituted | 3-(ethylamino)-phenyl-$SO_2C_2H_4OSO_3H$ ($C_2H_5$-HN- with $SO_2C_2H_4OSO_3H$) | Dark violet |

TABLE-continued
| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 5 | 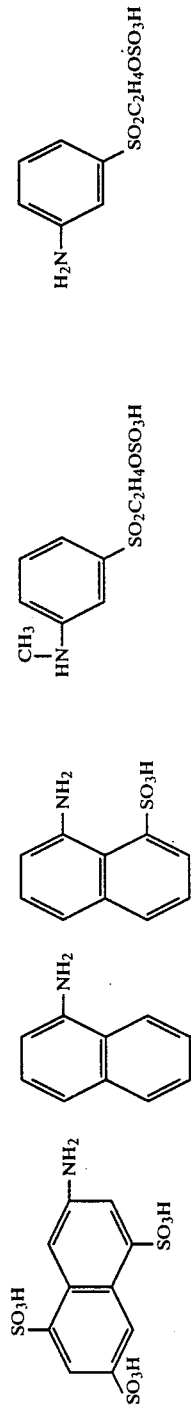 | 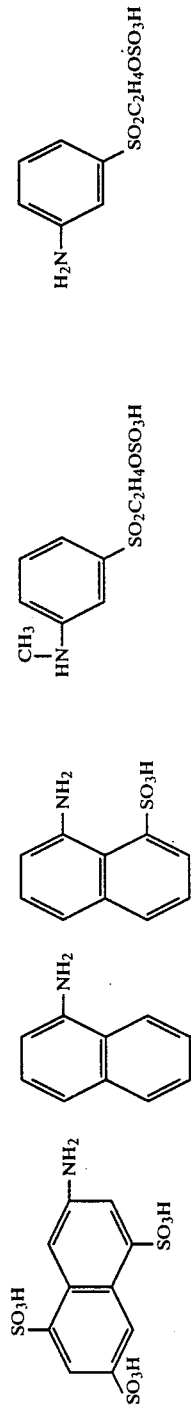 | 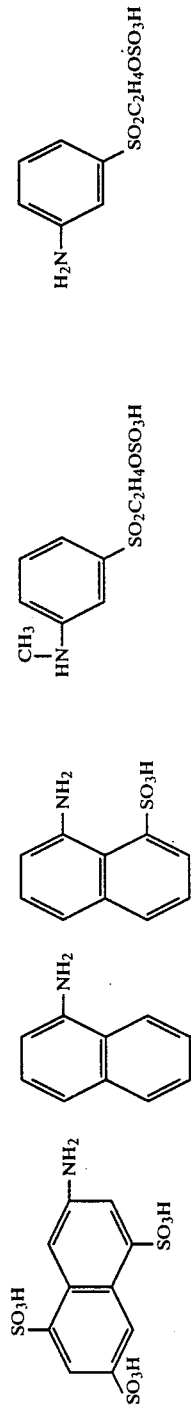 | 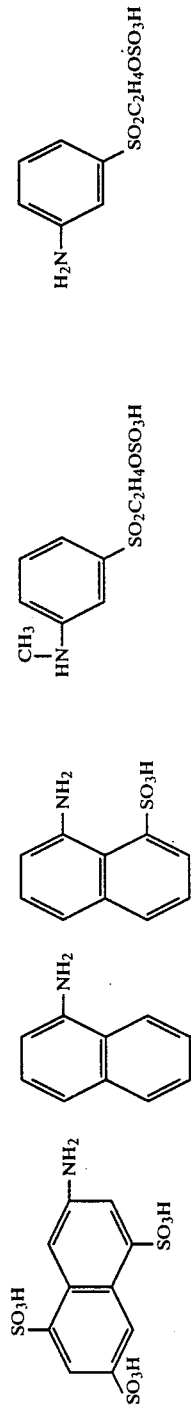 | 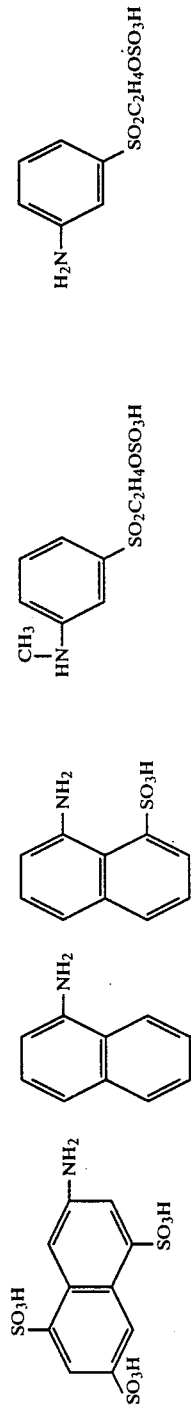 | " |
| 6 | 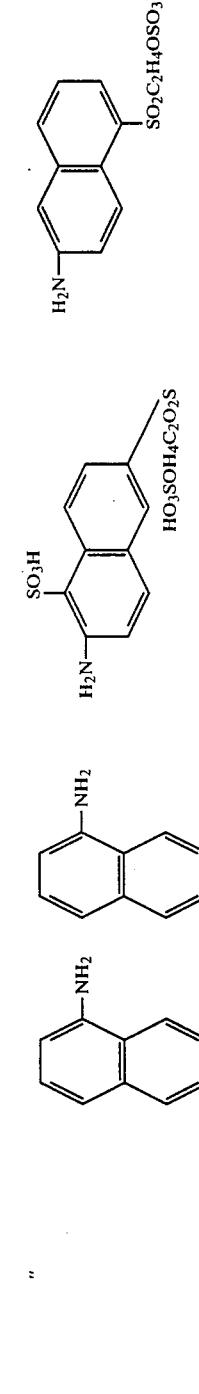 | 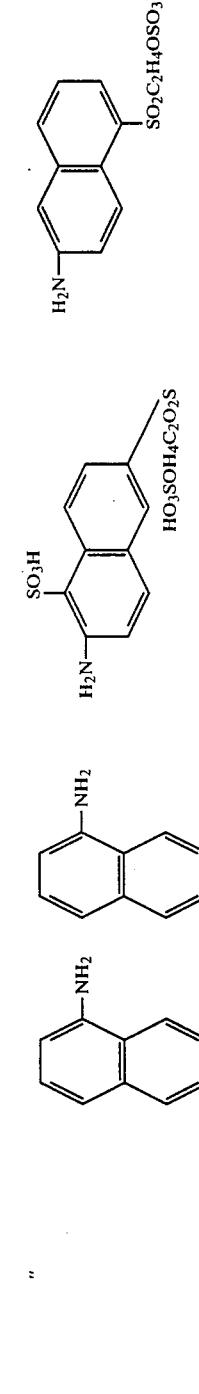 | 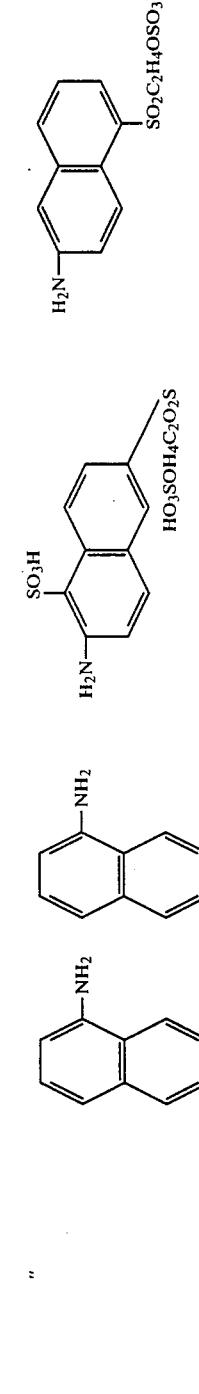 | 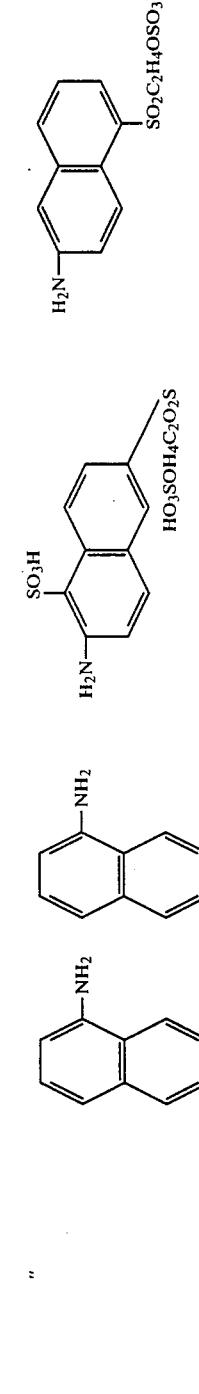 | 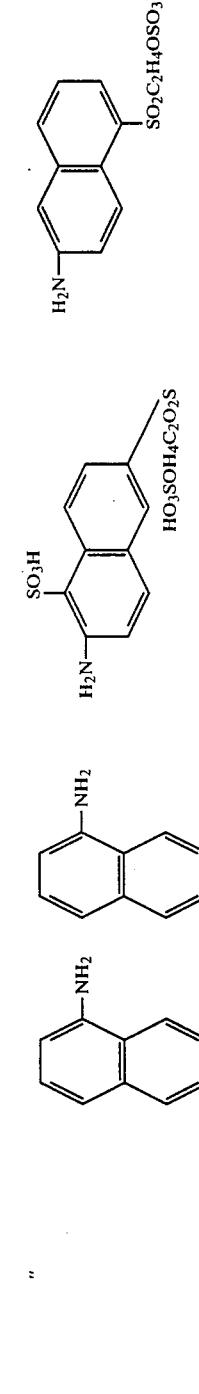 | " |
| 7 | 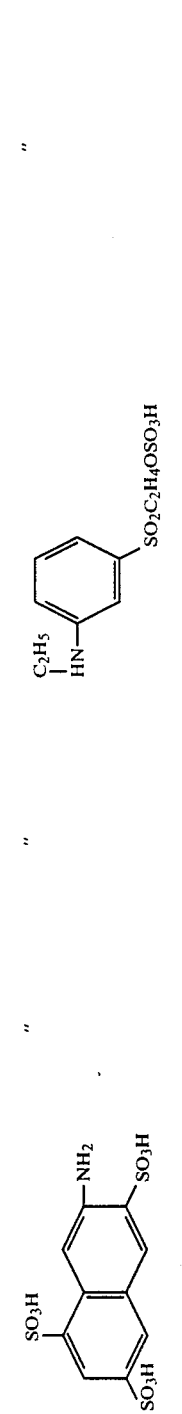 | " | " | 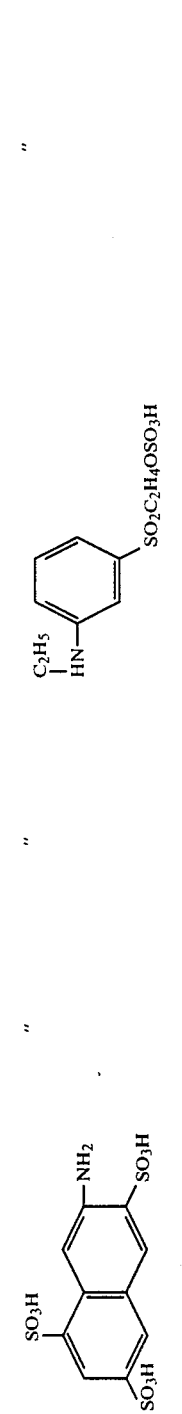 | " | " |
| 8 | 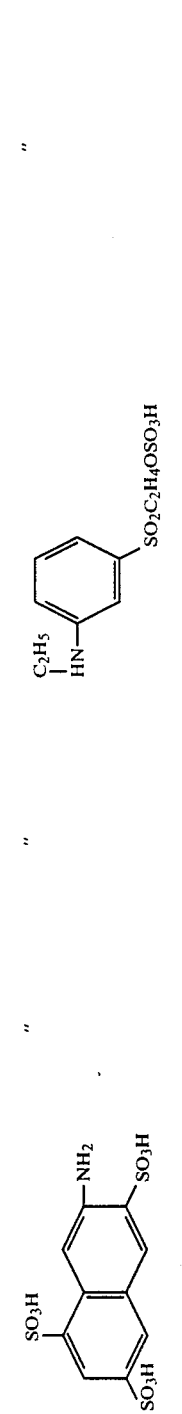 | 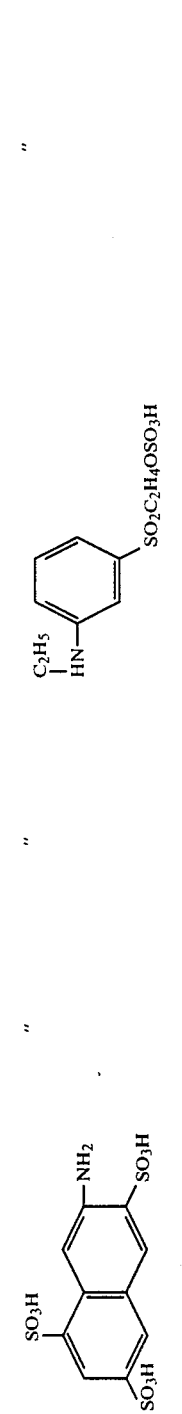 | 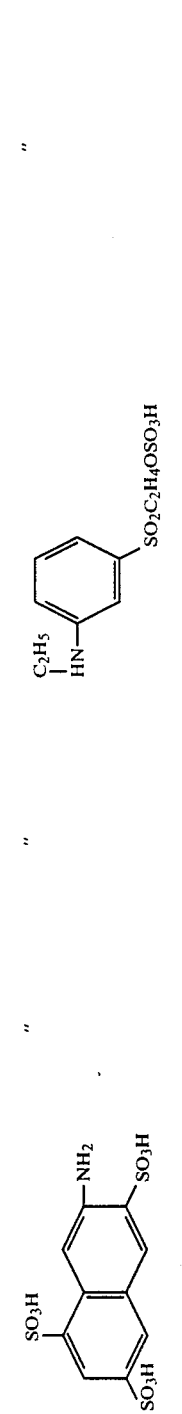 | 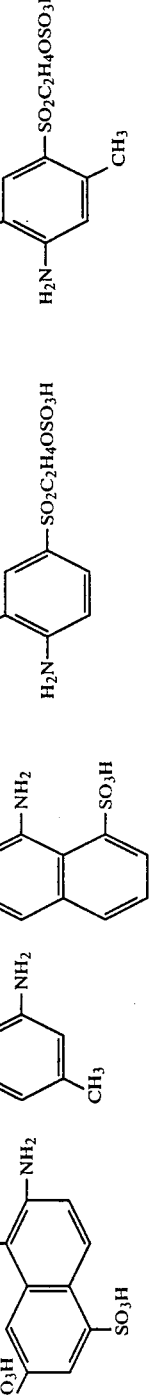 | 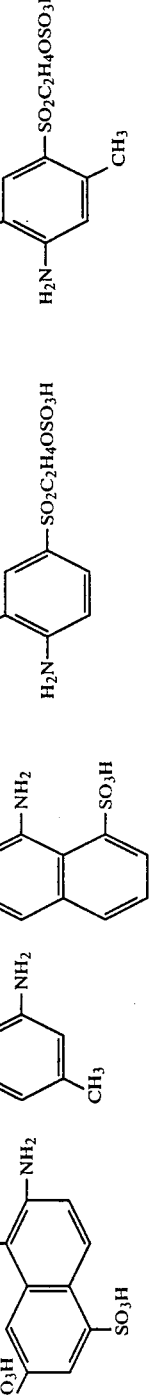 | Yellowish brown |

TABLE-continued

| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 9 | 7-amino-1,3-disulfo naphthalene (NH₂, SO₃H, SO₃H) | 8-amino-2-sulfo naphthalene (NH₂, SO₃H) | 3-methyl aniline (NH₂, CH₃) | 4-(N-methylamino)phenyl-SO₂C₂H₄OSO₃H | 6-amino-1,3-disulfo-naphthalene type with SO₂C₂H₄OSO₃H and SO₃H | " |
| 10 | 3-amino-1,5-disulfo naphthalene | 3-acetamido aniline (NH₂, NHCOCH₃) | 8-amino-2-sulfo naphthalene (NH₂, SO₃H) | 2-amino-4-(SO₂C₂H₄OSO₃H)-1-sulfobenzene | 8-amino-1-sulfo-6-(HO₃SOC₂H₄O₂S)naphthalene | Reddish brown |
| 11 | 3-amino-1,5-disulfo naphthalene | 8-amino-2-sulfo naphthalene | 3-methyl aniline | 3-(N-ethylamino)phenyl-SO₂C₂H₄OSO₃H | 3-amino-phenyl-SO₂C₂H₄OSO₃H | Yellowish brown |
| 12 | 3-amino-1,5-disulfo naphthalene | 8-amino-2-sulfo naphthalene | 3-(N-methylamino)toluene | 2-amino-3-sulfo-7-(HO₃SOC₂H₄O₂S)naphthalene | 3-amino-phenyl-SO₂CH=CH₂ | Yellowish brown |

TABLE-continued
| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 13 | " | 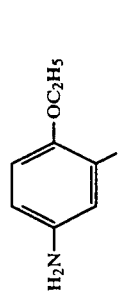 | 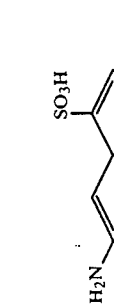 |  |  | Reddish brown |
| 14 | " | 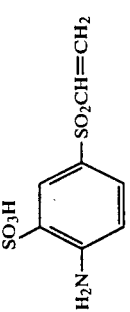 |  |  | 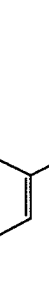 | Yellowish brown |
| 15 | " | 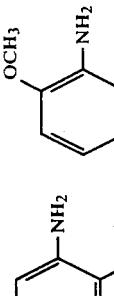 | " | 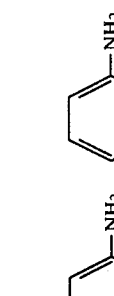 | " | Reddish brown |
| 16 | 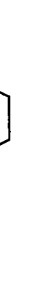 |  | 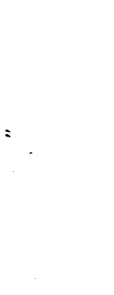 |  |  | Dark violet |

TABLE-continued
| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 17 | |  | 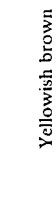 |  |  | Reddish brown |
| 18 | 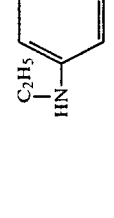 | " | | | | Dark brown |
| 19 | | | | | | Yellowish brown |
| 20 | 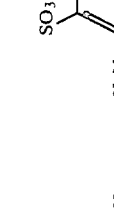 | 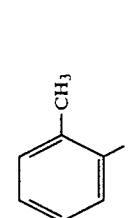 | | | | " |
| 21 |  | 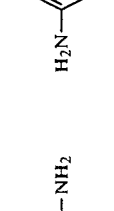 | |  | | Reddish brown |

TABLE-continued

| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 22 | 2,5-disulfo-4-methylaniline | " | 8-amino-2-naphthalenesulfonic acid | 5-amino-1-sulfo-naphthalene-SO₂CH₂CH₂OSO₃H | 4-amino-3-methylphenyl-SO₂CH₂CH₂OSO₃H | " |
| 23 | 2-sulfo-aniline | " | 8-amino-1-naphthalenesulfonic acid | 4-amino-3-sulfo-phenyl-SO₂C₂H₄OSO₃H | 4-amino-2,5-dimethoxyphenyl-SO₂CH₂CH₂OSO₃H | " |
| 24 | 3-amino-2,7-naphthalenedisulfonic acid | " | 3-amino-toluene | 8-amino-1-sulfo-naphthalene-SO₂CH₂CH₂OSO₃H | 3-amino-phenyl-SO₂C₂H₄OPO₃H₂ | " |
| 25 | " | 3-amino-toluene | 7-sulfo-8-amino-naphthalene | 4-amino-3-sulfo-phenyl-SO₂C₂H₄OSO₃H | 2-amino-5-sulfo-naphthalene-SO₂CH=CH₂ | " |

TABLE-continued

| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 26 | 4-amino-2-methoxy-5-sulfo benzenesulfonic acid (H₃CO, NH₂, SO₃H, SO₃H) | 8-amino-2-naphthalenesulfonic acid (NH₂, SO₃H) | 8-amino-1-naphthalenesulfonic acid (NH₂, SO₃H) | 3-aminophenyl-β-sulfatoethylsulfone (H₂N—C₆H₄—SO₂C₂H₄OSO₃H) | 3-aminophenyl-β-sulfatoethylsulfone (H₂N—C₆H₄—SO₂C₂H₄OSO₃H) | Reddish brown |
| 27 | 2-methoxy-5-aminobenzenesulfonic acid (H₃CO, SO₃H, NH₂) | ″ | ″ | 4-amino-3-sulfophenyl-β-sulfatoethylsulfone (SO₃H, H₂N—C₆H₃—SO₂C₂H₄OSO₃H) | ″ | ″ |
| 28 | 6-amino-1,5-naphthalenedisulfonic acid (NH₂, SO₃H, SO₃H) | 3-amino-anisole (NH₂, OCH₃) | ″ | 4-aminophenyl-β-sulfatoethylsulfone (H₂N—C₆H₄—SO₂C₂H₄OSO₃H) | ″ | ″ |
| 29 | ″ | 3-amino-acetanilide (NH₂, NHCOCH₃) | ″ | 4-(N-methylamino)phenyl-β-sulfatoethylsulfone (CH₃HN—C₆H₄—SO₂C₂H₄OSO₃H) | ″ | ″ |
| 30 | 6-amino-1,3-naphthalenedisulfonic acid (NH₂, SO₃H, SO₃H) | ″ | ″ | ″ | ″ | ″ |

TABLE-continued

| Run No. | Compound of Formula (VI-1) | Compound of Formula (VI-2) | Compound of Formula (VI-3) | Compound of Formula (II) | Compound of Formula (III) | Shade on cellulose |
|---|---|---|---|---|---|---|
| 31 | 2,7-diamino-naphthalene-1,5-disulfonic acid derivative (NH$_2$, SO$_3$H, SO$_3$H, SO$_3$H) | 8-amino-naphthalene-2-sulfonic acid (NH$_2$, SO$_3$H) | 3-aminoanisole (NH$_2$, OCH$_3$) | 3-aminophenyl-β-sulfatoethylsulfone (H$_2$N–C$_6$H$_4$–SO$_2$C$_2$H$_4$OSO$_3$H) | 4-aminophenyl-β-sulfatoethylsulfone (H$_2$N–C$_6$H$_4$–SO$_2$C$_2$H$_4$OSO$_3$H) | " |
| 32 | " | " | 3-aminoacetanilide (NH$_2$, NHCOCH$_3$) | 3-(N-methylamino)phenyl-β-sulfatoethylsulfone (CH$_3$HN–C$_6$H$_4$–SO$_2$C$_2$H$_4$OSO$_3$H) | | " |

What is claimed is:

1. A polyazo compound of the following formula (I),

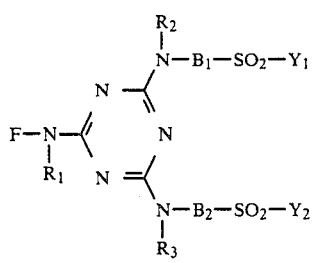

wherein $R_1$, $R_2$ and $R_3$ independently of one another are each hydrogen or $C_{1-4}$ alkyl, $B_1$ and $B_2$ independently of one another are each phenylene unsubstituted or substituted once or twice by methyl, methoxy, ethyl, ethoxy, nitro, sulfo, carboxy, chloro or bromo or naphthylene unsubstituted or substituted once by sulfo, and $Y_1$ and $Y_2$ independently of one another are each $-CH=CH_2$ or $-CH_2CH_2L$ in which L is a group capable of being split by the action of an alkali, and F is a polyazo dye moiety selected from the group consisting of those represented by the following formulas (1), (2), (3) and (4) each in free acid form, the formula (1) being

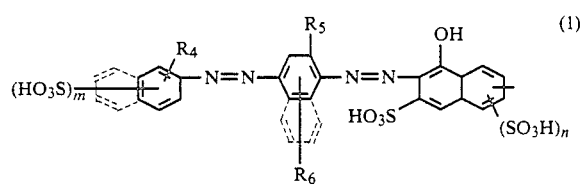

wherein $R_4$ is hydrogen, chloro, methyl, methoxy, ethyl, ethoxy, nitro or carboxy, $R_5$ is hydrogen, methyl, methoxy, ethyl, ethoxy or sulfo, $R_6$ is hydrogen, methyl, methoxy, ethyl, ethoxy, acetylamino, ureido or sulfo, m is 1,2 or 3 and n is 0 or 1, the formula (2) being

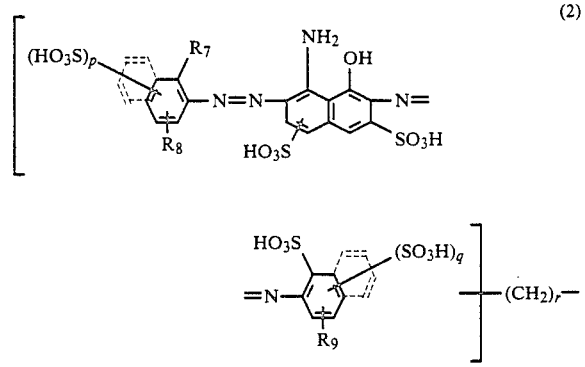

wherein $R_7$ is hydrogen, methyl, methoxy, ethyl, ethoxy, chloro, carboxy or sulfo, $R_8$ and $R_9$ independently of one another are each hydrogen, methyl, methoxy, ethyl, ethoxy, chloro, bromo, acetylamino, sulfamoyl or carbamoyl and p and q independently of one another are each 0, 1 or 2, r is 0 or 1, the formula (3) being

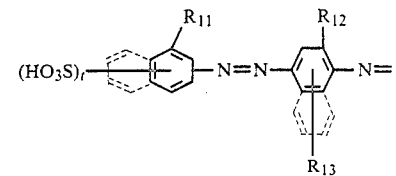

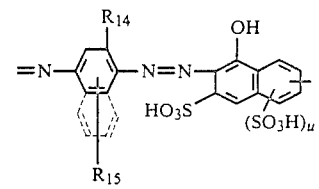

wherein $R_{11}$ is hydrogen, chloro, $C_{1-4}$ alkyl, $C_{1-4}$ alkoxy, nitro or carboxy, $R_{12}$ and $R_{14}$ independently of one another are each hydrogen, $C_{1-4}$ alkyl, $C_{1-4}$ alkoxy or sulfo, $R_{13}$ and $R_{15}$ independently of one another are each hydrogen, $C_{1-4}$ alkyl, $C_{1-4}$ alkoxy, $C_{2-5}$ alkanoylamino, benzoylamino, ureido or sulfo, t is 1,2 or 3 and u is 0 or 1, and the formula (4) being $$A-N=N-13\ D-N=N-E- \qquad (4)$$

wherein A is sulfonaphthyl or sulfophenyl represented by the following formulas (a) and (b) each in free acid form, respectively,

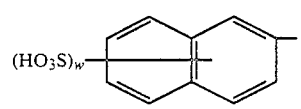

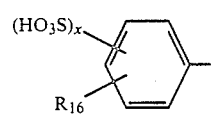

wherein $R_{16}$ is hydrogen, $C_{1-4}$ alkyl or $C_{1-4}$ alkoxy, w is 2 or 3 and x is 1 or 2, D is sulfonaphthylene or phenylene represented by the following formulas (c) and (d) each in free acid form, respectively,

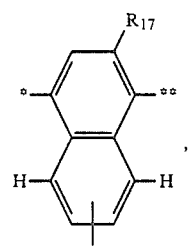

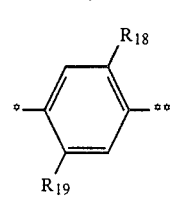

wherein the linkage marked by * and ** bond to $A-N=N-$ and $-N=N-E-$, respectively, $R_{17}$ is hydrogen, methoxy or sulfo, $R_{18}$ is hydrogen, $C_{1-4}$ alkyl, $C_{1-4}$ alkoxy or sulfo, $R_{19}$ is hydrogen, $C_{1-4}$ alkyl, $C_{1-4}$ alkoxy, $C_{2-5}$ alkanoylamino, benzoylamino, ureido or $C_{1-4}$ alkylsulfonylamino, and E is sulfonaphthylene or phenylene represented by the following formulas (e) and (f) each in free acid form, respectively,

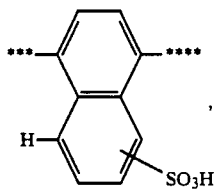 (e)

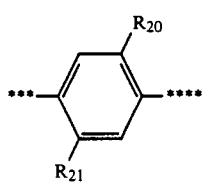 (f)

where the linkage marked by * and ** bond to the azo and

respectively, $R_{20}$ is hydrogen, $C_{1-4}$ alkyl, $C_{1-4}$ alkoxy or sulfo, and $R_{21}$ is hydrogen, $C_{1-4}$ alkyl, $C_{1-4}$ alkoxy, $C_{2-5}$ alkanoylamino, benzoylamino, ureido or $C_{1-4}$ alkylsulfonylamino, provided that at least two of A, D and E are the sulfonaphthyl or sulfonaphthylene represented by the formulas (a), (c) and (e).

2. A polyazo compound according to claim 1, wherein $R_1$ is hydrogen or methyl, and $R_2$ and $R_3$ independently of one another are each hydrogen, methyl or ethyl.

3. A polyazo compound according to claim 1, wherein $Y_1$ and $Y_2$ are both $\beta$-sulfatoethyl.

4. A polyazo compound according to claim 1, wherein $R_{11}$ is hydrogen.

5. A polyazo compound according to claim 1, wherein $R_{12}$ and $R_{14}$ independently of one another are each hydrogen, methyl, ethyl, methoxy, ethoxy or sulfo.

6. A polyazo compound according to claim 1, wherein $R_{13}$ and $R_{15}$ independently of one another are each hydrogen, methyl, ethyl, methoxy, ethoxy, acetylamino, ureido or sulfo.

7. A polyazo compound according to claim 1, wherein $R_{16}$ is hydrogen, methyl, ethyl, methoxy or ethoxy.

8. A polyazo compound according to claim 1, wherein $R_{17}$ is hydrogen.

9. A polyazo compound according to claim 1, wherein $R_{18}$ is hydrogen, methyl, methoxy or sulfo, and $R_{19}$ is methyl, methoxy, acetylamino or ureido.

10. A polyazo compound according to claim 1, wherein $R_{20}$ is hydrogen, methyl, methoxy or sulfo, and $R_{21}$ is methyl, methoxy, acetylamino or ureido.

11. A polyazo compound according to claim 1, wherein $R_1$ is hydrogen and E is 8-sulfonaphthylene.

* * * * *